US008386234B2

(12) United States Patent
Uchimoto et al.

(10) Patent No.: US 8,386,234 B2
(45) Date of Patent: Feb. 26, 2013

(54) METHOD FOR GENERATING A TEXT SENTENCE IN A TARGET LANGUAGE AND TEXT SENTENCE GENERATING APPARATUS

(75) Inventors: Kiyotaka Uchimoto, Tokyo (JP); Hitoshi Isahara, Tokyo (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 613 days.

(21) Appl. No.: 10/587,514

(22) PCT Filed: Jan. 28, 2005

(86) PCT No.: PCT/JP2005/001636
§ 371 (c)(1), (2), (4) Date: Dec. 20, 2006

(87) PCT Pub. No.: WO2005/073874
PCT Pub. Date: Aug. 11, 2005

(65) Prior Publication Data
US 2007/0129935 A1  Jun. 7, 2007

(30) Foreign Application Priority Data
Jan. 30, 2004 (JP) ................................. 2004-023913

(51) Int. Cl.
*G06F 17/28* (2006.01)
(52) U.S. Cl. ..................................... 704/4; 704/2; 704/7
(58) Field of Classification Search .................. 704/2, 4, 704/7, 9
See application file for complete search history.

(56) References Cited

U.S. PATENT DOCUMENTS

| 5,321,607 | A  | * | 6/1994  | Fukumochi et al. | 704/4 |
| 5,473,705 | A  |   | 12/1995 | Abe et al.       |       |
| 5,490,061 | A  | * | 2/1996  | Tolin et al.     | 704/2 |
| 5,608,623 | A  | * | 3/1997  | Sata et al.      | 704/4 |
| 5,867,811 | A  | * | 2/1999  | O'Donoghue       | 704/1 |
| 6,243,669 | B1 | * | 6/2001  | Horiguchi et al. | 704/9 |
| 6,278,967 | B1 | * | 8/2001  | Akers et al.     | 704/2 |
| 6,345,244 | B1 | * | 2/2002  | Clark            | 704/2 |

(Continued)

FOREIGN PATENT DOCUMENTS

| JP | 5-250407 A    | 9/1993  |
| JP | 2002-334076 A | 11/2002 |

(Continued)

OTHER PUBLICATIONS

Emi Izumi et al., Automatic error detection in the Japanese learner's English spoken data, 2003.

(Continued)

*Primary Examiner* — Jesse Pullias
(74) *Attorney, Agent, or Firm* — Birch, Stewart, Kolasch & Birch, LLP

(57) ABSTRACT

By inputting words of source language as a keyword (31), a translation pairs are extracted (50) from a parallel corpus database including source language and target one. From the partially corresponding information on the translation sentence, a corresponding phrase group table formed by the corresponding phase of the target language corresponding to the source language phrase including a keyword phrase f the source language is stored (60). Text generator (70) assumes a relationship between the phrases of different language contained in the corresponding phrase group table and generates a text sentence candidate (32) of the target language.

24 Claims, 14 Drawing Sheets

U.S. PATENT DOCUMENTS

| | | | |
|---|---|---|---|
| 6,604,101 B1 * | 8/2003 | Chan et al. | 707/4 |
| 6,622,123 B1 * | 9/2003 | Chanod et al. | 704/277 |
| 6,985,851 B2 * | 1/2006 | Weise et al. | 704/9 |
| 2002/0010573 A1 * | 1/2002 | Wakita et al. | 704/2 |
| 2003/0061023 A1 * | 3/2003 | Menezes et al. | 704/4 |
| 2003/0149686 A1 * | 8/2003 | Drissi et al. | 707/3 |
| 2004/0059730 A1 * | 3/2004 | Zhou | 707/4 |
| 2004/0181389 A1 * | 9/2004 | Bourigault et al. | 704/1 |
| 2005/0050469 A1 | 3/2005 | Uchimoto et al. | |
| 2005/0171757 A1 * | 8/2005 | Appleby | 704/2 |
| 2005/0171759 A1 | 8/2005 | Uchimoto et al. | |

FOREIGN PATENT DOCUMENTS

| | | |
|---|---|---|
| JP | 3388393 B2 | 1/2003 |
| JP | 2003-196280 A | 7/2003 |
| JP | 2003-271592 A | 9/2003 |

OTHER PUBLICATIONS

Toru Hisamitsu et al., 133-16, Measuring Representativeness of Terms, Sep. 10, 1999, pp. 115-122.

Kishore Papineni et al., IBM Research Report, BLEU: a Method for Automatic Evaluation of Machine Translation, Sep. 17, 2001.

* cited by examiner

FIG.1

1  また、(mata,)
2  一九九五年中の(1995-nen chu no)
3  衆院解散・総選挙の(shu-in kaisan/sousenkyo no)
4  可能性に(kanousei ni)
5  否定的な(hiteiteki na)
6  見解を(kenkai wo)
7  表明、(hyoumei,) ——— P
8  二十日(hatsuka)
9  召集予定の(shoushu yotei no)
10 通常国会前の(tsujou kokkai mae no)
11 内閣改造を(naikaku kaizou wo)
12 明確に(meikaku ni)
13 否定した。(hitei shita.)

METHOD FOR GENERATING A TEXT SENTENCE IN A TARGET LANGUAGE AND TEXT SENTENCE GENERATING APPARATUS

FIELD OF THE INVENTION

The present invention relates to a method and apparatus for a natural language processing. Especially, it relates to a method of generating a text sentence in a target language different from a source language by inputting one or more keywords.

BACKGROUND ART

There are many known methods of analyzing and generating a text sentence by using a computer. Those methods can be roughly classified into two groups depending on whether analysis and generation of text sentence are performed based on rules established by human beings or established via statistical learning. In the methods of the former group, processing is performed using a sufficiently wide variety of knowledge. In the methods of the latter group, processing is performed using a sufficiently large amount of simple knowledge to improve accuracy of the method.

In order to perform correct analysis and generate a good text sentence, it is desirable to use a wide variety of knowledge such as knowledge obtained from surface information appearing in or among sentences, knowledge described in a dictionary, linguistic knowledge, etc.

However, in the former method, very complicated rules are required because various kinds of knowledge are treated. The increase in complexity in rules can result in an increase in possibility that conflicts occur among rules. In some cases, arbitration of conflicts among rules is difficult.

If a wide variety of knowledge is used in the latter method, overtraining often occurs. To avoid overtraining, a large amount of learning data is necessary. In the latter method, if a wide variety of knowledge is used and learning is performed properly, the processing accuracy can be improved. However, in the latter method, use of a wide variety of knowledge has not been considered with a few exceptions.

The inventors of the present invention have proposed a new model for text sentence analysis and generation based on the statistical learning. The details of this technique are disclosed in Japanese Unexamined Patent Application No. 2002-334076. This technique is mainly based on the maximum entropy principle, and can efficiently deal with a wide variety of knowledge without falling in overtraining. Experiments have revealed that this technique can provide higher accuracy compared with the conventional statistical methods. In this method, a technique has been established as to how efficiently to use knowledge obtained by learning data, dictionary knowledge, linguistic knowledge, etc., and as to what kind of knowledge should be used in text sentence analysis and generation.

A specific example of a text generation system is disclosed, for example, in Japanese Unexamined Patent Application No. 2003-196280 filed by the present applicant. In this system, when one or more keywords are input, text sentences including the input keywords are extracted from a database, and morphological and syntax structure analysis is performed on the extracted text sentences. Based on the result of the analysis, a text sentence including the keywords is generated.

In a system disclosed in Japanese Unexamined Patent Application No. 2003-271592, word-unit candidates are generated from input keywords, and dependency relationships among the word-unit candidates are assumed. A text sentence candidate is generated according to the assumed dependency relationships. This method allows a natural text sentence to be produced from a small number of keywords.

The techniques described above generates a text sentence in a certain language, for example, Japanese, from keywords in the same language and do not generate a text sentence in a language different from the language of keywords. That is, in the known techniques, a text sentence in the same language as the language of input keywords is generated based on a monolingual corpus, and application of the method disclosed in Japanese Unexamined Patent Application No. 2003-271592 above mentioned to generation of a text sentence in a language different from the language of input keywords has not been achieved.

Machine translation is known as a technique to output a text sentence in a language different from a language of an input text sentence. In machine translation, in general, an input text sentence in a source language is analyzed, and a translation thereof in a target language is generated from the analysis result.

If a natural text sentence can be output from keywords without needing a full text sentence, it becomes very convenient for a user to communicate with another user.

In recent years, it has become easy for a large number of people over the world to communicate with one another via a network. However, there is still a language barrier, which makes it difficult to communicate with one another speaking different languages. Although great advances in machine translation have been made, commercially available machine translation systems are not sufficiently high in performance to allow users speaking different languages to communicate easily with one another.

Thus, there is a need for a target-language text sentence generation method that eliminates the language barrier and that allows users to easily communication with one another in various nations.

In view of the above, an object of the present invention is to provide a method for generating a natural text sentence in a target language different from a source language, based on one or more keywords of the source language given by a user and target language text sentence generating apparatus.

DISCLOSURE OF INVENTION

To achieve the above object, the present invention provides a method of generating a text sentence in a target language different in a source language, based on one or more words in the source language input as keywords. In an input step of the method, one or more keywords in the source language are input via an input means. The method comprises further a sentence pair extraction step in which a sentence pair extraction means extracts one or more sentence pairs each including at least one of the keywords from a parallel corpus database including partial correspondence information indicating correspondence between a word/phrase in the source language and a word/phrase in the target language in each sentence pair, a keyword-related phrase storage step in which a target-language keyword-related phrase corresponding to each source-language keyword-related phrase is detected from the partial correspondence information of each sentence pair and stored in the form of a keyword-related phrase table in a storage means, a text sentence candidate generation step in which a text candidate generation means assumes dependency relationships among keyword-related phrases in the target language described in the keyword-related phrase table and generates one or more target-language text sentence candidates. In an output step of the method, at least one text sentence candidate is output from an output means.

The method may further comprise a keyword-related phrase presentation step in which if, in the sentence pair extraction step, two or more sentence pairs are extracted for a keyword input in the input step and if two or more different keyword-related phrases in the source language are detected from the partial correspondence information, then the detected two or more keyword-related phrases in the source language are presented to a user such that the user is allowed to select a keyword-related phrase from the presented two or more keyword-related phrases, wherein in the keyword-related phrase storage step, if the user selects a keyword-related phrase from the presented two or more keyword-related phrases, a keyword-related phrase in the target language corresponding to the selected keyword-related phrase in the source language is described in the keyword-related phrase table.

In the method of generating a text sentence in the target language, each time one keyword is input in the input step, the sentence pair extraction step and the keyword-related phrase storage step may be performed, and the method may further comprise a co-occurrence word extraction step in which one or more co-occurrence words which co-occur with the keyword in the sentence pair are extracted and the extracted one or more co-occurrence words are described in a co-occurrence word table, and a co-occurrence word presentation step in which the one or more co-occurrence words are presented to a user such that the user can select one or more co-occurrence word from the co-occurrence words described in the co-occurrence word table, wherein if one or more co-occurrence words are selected by the user in the input step, the selected one or more co-occurrence words are input as new keywords, and the text sentence candidate generation step is performed after completion of inputting all keywords.

Furthermore, in the sentence pair extraction step in the method of generating a text sentence in a target language, at the beginning of the step, one or more morphemes may be added to or subtracted from a keyword input in the input step or a keyword input in the input step may be replaced with a similar word.

It is the method of generating a text sentence of a plurality of target languages, wherein a text sentence may be generated for each of two or more target languages by performing the sentence pair extraction step, the keyword-related phrase storage step, and the text sentence candidate generation step for each combination of source and target languages. For example, to generate a text sentence in each of first, second and third target languages, the steps described above are performed for each of a combination of the source language and the first target language, a combination of the source language and the second language, and a combination of the source language and the third target language. Then, in the output step, text sentence candidates of all target languages may be output.

Furthermore, in the text sentence candidate generation step of the method, preferably, the text candidate generation means assumes dependency relationships among keyword-related phrases in the target language described in the keyword-related phrase table and generates one or more target-language text sentence candidates, and a source-language text candidate generation means assumes dependency relationships among keyword-related phrases in the source language described in the keyword-related phrase table and generates one or more source-language text sentence candidate. Then, in the output step, at least one set of text sentences in the source and target languages is output from the output means.

In the method may further comprise, after the text sentence candidate generation step, an evaluation step in which an evaluation means evaluates each text sentence candidate, wherein in the output step, at least one text sentence candidate is selected based on the evaluation and the selected text sentence candidate is output.

In the present invention also provides an apparatus for generating a text sentence in a target language as mentioned below.

That is, it is an apparatus for generating a text sentence in a target language different in a source language, based on one or more words in the source language input as keywords, the apparatus comprising an input means for inputting one or more keywords in the source language, a parallel corpus database including partial correspondence information indicating correspondence between a word/phrase in the source language and a word/phrase in the target language in each sentence pair, a sentence pair extraction means for extracting one or more sentence pairs each including at least one of the keywords from the parallel corpus database, a keyword-related phrase storage means for detecting a target-language keyword-related phrase corresponding to each source-language keyword-related phrase from the partial correspondence information of each sentence pair and storing the detected target-language keyword-related phrase in the form of a keyword-related phrase table, a text candidate generation means that assumes dependency relationships among keyword-related phrases in the target language described in the keyword-related phrase table and generates one or more target-language text sentence candidates; and an output means for outputting at least one text sentence candidate.

In the apparatus may further comprise a source-language keyword-related phrase candidate presentation means that determines, in a case in which two or more sentence pairs corresponding to an input keyword have been extracted by the sentence pair extraction means, whether two or more different keyword-related phrases in the source language are detected from the partial correspondence information associated with the two or more sentence pairs and that, if so, presents to a user the detected two or more keyword-related phrases such that the user is allowed to select a keyword-related phrase from the presented two or more keyword-related phrases in the source language via the input means, wherein if the user selects a keyword-related phrase from the presented two or more keyword-related phrases, the keyword-related phrase storage means stores a keyword-related phrase in the target language corresponding to the selected keyword-related phrase in the source language in the keyword-related phrase table.

In the apparatus for generating a text sentence in the target language, each time one keyword is input via the input means, the sentence pair extraction means and the keyword-related phrase storage means may operate, and the apparatus may further comprise a co-occurrence word extraction means for extracting one or more co-occurrence words which co-occur with the keyword in the sentence pair and describing the extracted one or more co-occurrence words in a co-occurrence word table, and a co-occurrence word presentation means for presenting the one or more co-occurrence words to a user such that the user can select one or more co-occurrence word from the co-occurrence words described in the co-occurrence word table, wherein if one or more co-occurrence words are selected by the user via the input means, the selected one or more co-occurrence words are input as new keywords, and the text candidate generation means operates after completion of inputting all keywords.

Further, the apparatus for generating a text sentence in the target language may comprise a keyword modification means for modifying a keyword input via the input means by adding or subtracting one or more morphemes to or from the keyword or replacing the keyword with a similar word, wherein the sentence pair extraction means performs keyword modification using the keyword modification means.

In the apparatus for generating a text sentence in the target language, preferably, the parallel corpus database includes partial correspondence information indicating correspondence between a word/phrase in the source language and a word/phrase in the target language in each sentence pair, the sentence pair extraction means, the keyword-related phrase storage means, and the text candidate generation means may perform processing for each combination of source and target languages, and text sentence candidates of respective two or more languages may be output from the output means.

In the apparatus for generating a text sentence in the target language, preferably, the text candidate generation means assumes dependency relationships among keyword-related phrases in the target language described in the keyword-related phrase table and generates one or more target-language text sentence candidates, and the apparatus further comprises a source-language text candidate generation means that assumes dependency relationships among keyword-related phrases in the source language described in the keyword-related phrase table and generates one or more source-language text sentence candidate, wherein at least one set of text sentences in the source language and target languages may be output from the output means.

In the apparatus for generating a text sentence in the target language, the evaluation means for evaluating the one or more text sentence candidates.

BRIEF DESCRIPTION OF THE DRAWINGS

FIG. 1 is a diagram showing a dependency structure tree of a corpus used in the present invention.

DESCRIPTION OF THE PREFERRED EMBODIMENTS

Figure 2:
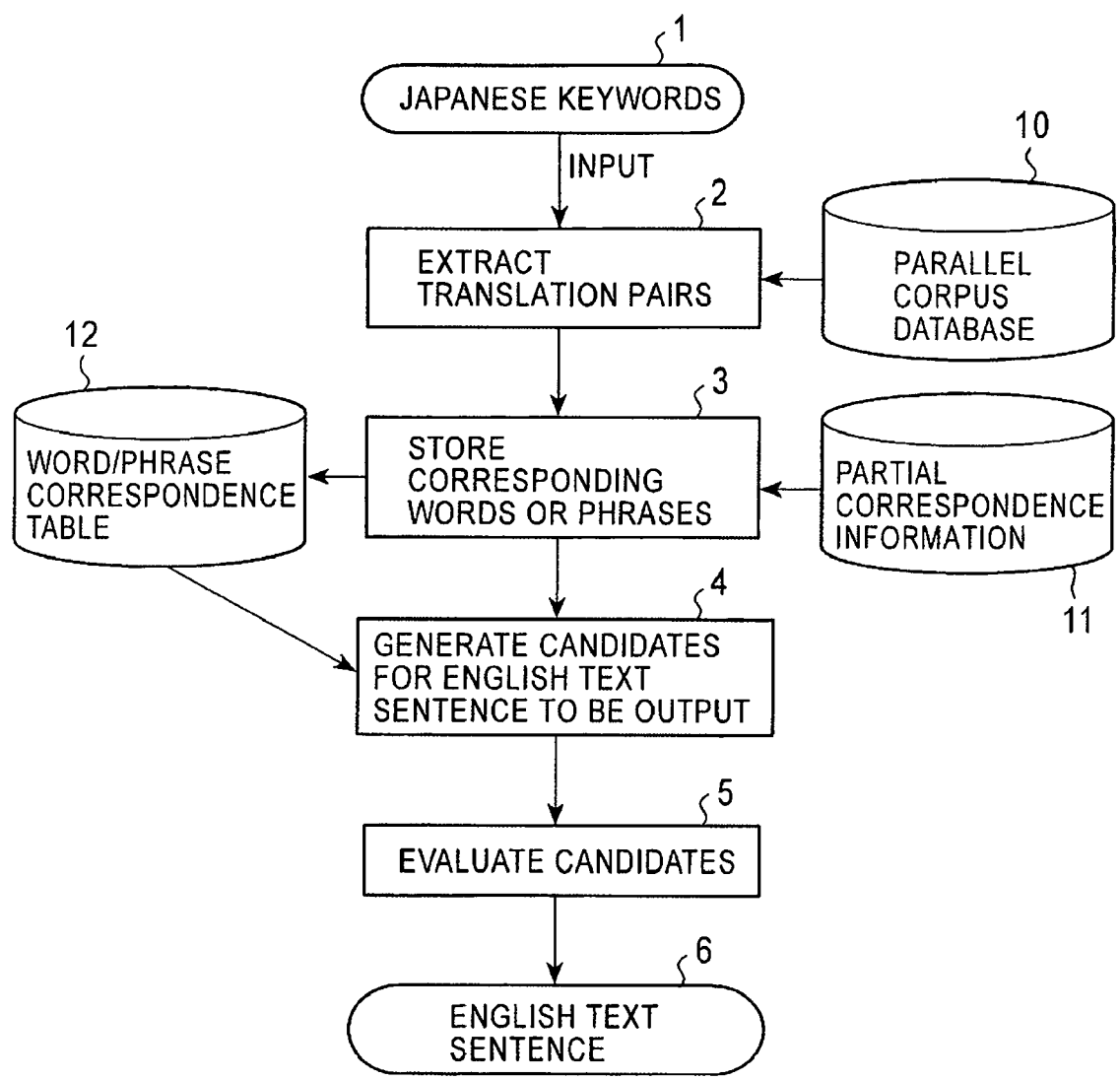
FIG. 2 is a flow chart associated with a text sentence generation method according to example 1 of the present invention.

The present invention is described in further detail below with reference to, by way of example but not limitation, preferred examples in conjunction with the accompanying drawings.

First, the present invention is outlined. In conventional machine translation, when a text sentence in a source language is given, a translated text (sentence or assembly thereof) in a target language is output. Although an improvement in translation accuracy has been achieved in recent years, a translation is often unnatural because of difficulty in analysis of the text sentence in the source language and difficulty in generation of the text sentence in the target language. Such an unnatural text sentence, which is grammatically correct in many cases, can cause difficulty in communication.

Depending on the performance of the machine translation system, it is needed to modify an input text sentence in the source language into a form that can be better handled by the system. Besides, it is required that the input text sentence should include a necessary and sufficient words. Thus, a special skill is needed to use the machine translation system. On the other hand, the Internet has become very popular. The internet provides an environment in which a user can communicate with a very large number of other users over the world. To freely communicate with many people over the world, there is an urgent need for a technique that generates a correct text sentence in a target language.

In view of the above, the present invention provides a technique of, when one or more keywords in a source language are input, generating a text sentence in a target language from the input keywords. That is, when a user inputs one or more source-language words that are important in what is to be told to another user, one or more pairs of a source-language sentence including at least one of the input keywords and a translation thereof in a target language (hereinafter, such a pair will be referred to simply as a sentence pair) are extracted from a database. A text sentence in the source language corresponding to the generated text sentence in the target language is presented to the user, and thus the user can confirm whether the generated text sentence in the target language correctly represents what the user wants to tell.

In the present invention, a collection of a large number of pairs of a sentence in the source language and a translation thereof in the target language is stored in the form of a database called a parallel corpus database. Preferably, translations in the parallel corpus database are prepared by human translators. The parallel corpus database includes syntactic information of each sentence and also includes information indicating correspondence of phrase or clause between two languages.

The inventors of the present invention have developed a Japanese-English corpus including about 40,000 sentence pairs associated with newspaper articles. Translations of this corpus were prepared by professional human translators.

In this corpus, one Japanese sentence is translated into an English sentence (one sentence) and natural one. When an original Japanese sentence has no explicit subject, a subject is determined based on context and the determined subject is added to the original sentence. The subject may be of a noun, pronoun, or a proper noun depending on the context. Thus, Japanese sentences and corresponding English sentences included in this corpus are very natural in expression.

Data form of the corpus is described below briefly. For example, when a Japanese sentence "また、一九九五年中の衆院 解散・総選挙の可能性に否定的な 見解を表明、二十日召集予定の通 常国会前の内 閣改造を明確 に否定した。(hereinafter, pronunciation of words were expressed in alphabet with parenthesis) (mata, 1995-nen chu no shu-in kaisan/sousen-kyo no kanousei ni hiteiteki na kenkai wo hyoumei, hatsuka shoushu yotei no tsujou kokkai mae no naikaku kaizou wo meikakuni hitei shita.) "is given, a dependency structure tree is defined as shown in FIG. 1, in which an ID number is assigned to each phrase and described on a side left to each phrase. Furthermore, phrase numbers, dependency relationships, morphemes, pronunciation, and word class are represented as follows.

* 0 12D

また　また (mata) * conjunction * * *

, , * special comma * *

* 1 2D

一九九五　いちきゅうきゅうご (itikyukyugo) * noun numeral
* *

年　ねん (nen) * suffix nominal-noun-countersuffix * *

中　ちゅう (chu) * suffix nominal-nounsuffix * *

の　の (no) * particle conjunctive-particle * *

Below is an example of an English translation of the above Japanese sentence. "He also responded negatively to the possibility of dissolution of the House of Representatives and general elections before the end of 1995 and clearly denied a cabinet reshuffle would take place prior to the ordinary Diet session scheduled to be convened on the 20th." The correspondence between each phrase in the Japanese sentence and a counterpart in English is represented as follows:

<P id="6, 7">He<¥P> <P id="1">also<¥P> <P id="6, 7">responded<¥P> <P id="5">negatively<¥P> <P id="4">to the possibility<¥P> <P id="3">of dissolution of the House of Representatives and general elections <¥P> . . . " where an English phrase corresponding to a Japanese phrase assigned a particular ID number is written between a start tag <P id=" ">in which the ID number is written and an end tag <¥P>.

EXAMPLE 1

FIG. 2 is a flow chart associated with a target language text sentence generation method according to Example 1 of the present invention. As shown in FIG. 2, when one or more words/phrases 1 in a source language (Japanese) are input as keywords, one or more pairs of a source language sentence including at least one of the input keywords (1) and a translation thereof in a target language (such a pair is referred to simply as a sentence pair) are extracted (2) from the parallel corpus database (10).

Thereafter, one or more keyword-related words/phrases in the target language corresponding to each keyword included in the extracted sentence pairs are extracted from partial correspondence information (11), and described in a keyword-related phrase table (12). Note that the partial correspondence information (11) is information included in the parallel corpus database (10), the partial correspondence information (11) and the keyword-related phrase table (12) are the same.

Thus, words/phrases in the target language corresponding to the input keywords are obtained. Dependency relationships among these words/phrases are properly assumed, and one or more target-language text sentence candidates to be output are generated (4).

Text sentence candidates obtained may be directly output without being evaluated, but these text sentence candidates in the example are evaluated and a most suitable sentence is selected from the candidates (5). The selected sentence (in English) is output (6).

Figure 7:
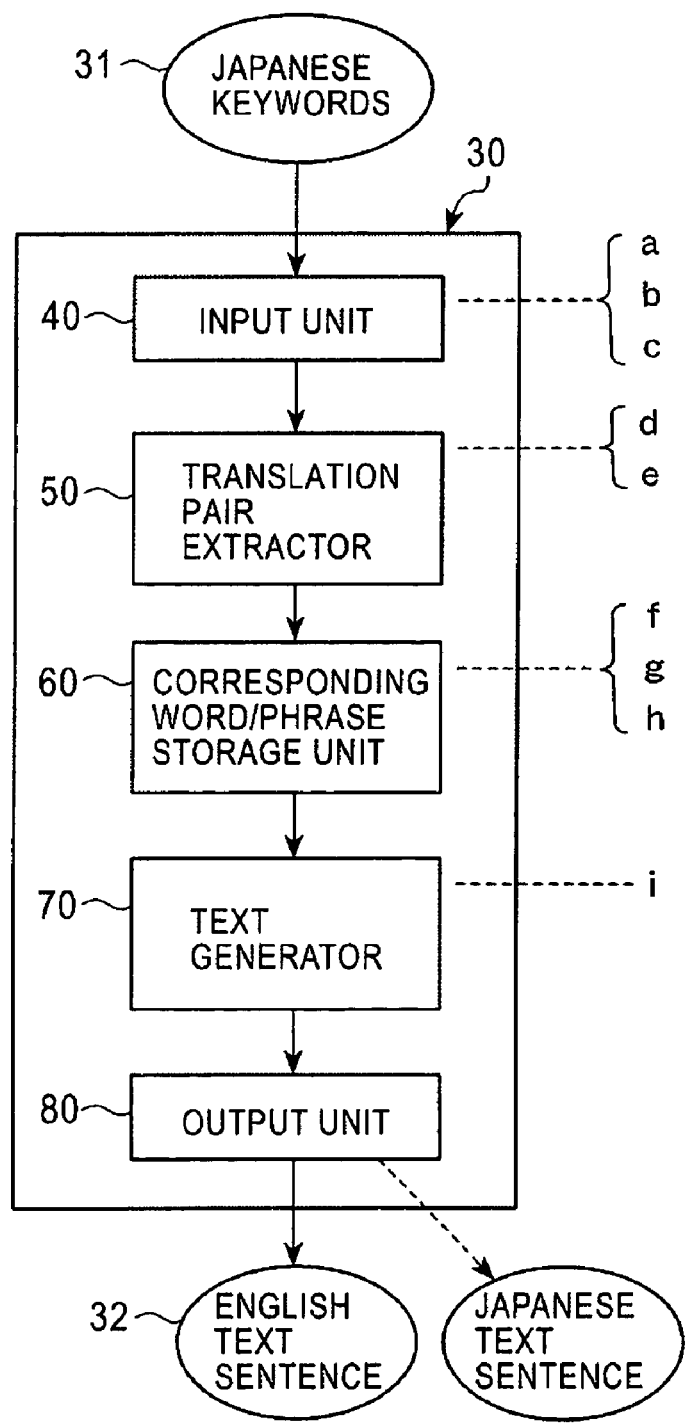
FIG. 7 is a block diagram of a text generation apparatus according to the present invention.

FIG. 7 shows a text generation apparatus in which the text sentence generation method according to the present invention is implemented. If Japanese keywords, for example, "彼女 (kanojo)", "公園 (kouen)", and "行く (iku)" are input to an text generation apparatus (30) via an input unit (40), a translation pair extractor (50) extracts one or more sentence pairs including at least one of the input keywords from the database. In this specific example, "公園へ行った (Kouen he itta)/I went to the park", "彼女と百貨店 へ行った (kanojo to hyakkaten he itta)/I went to the department store with her" are extracted as sentence pairs.

A keyword-related phrase storage unit (60) extracts word/phrase pairs associated with any keyword from the sentence pairs, based on partial correspondence information and stores the extracted word/phrase pairs. In this specific example, "公園へ (kouen e)/to the park", "行った (itta)/I went", and "彼女と (kanojo to)/with her" are extracted and stored.

A text generator (70) generates an English text sentence "I went to the park with her" based on the extracted word/phrase pairs. The resultant English text sentence (32) is output from output unit (80).

The parts (40) to (80) are described in further detail below.

Figure 8:
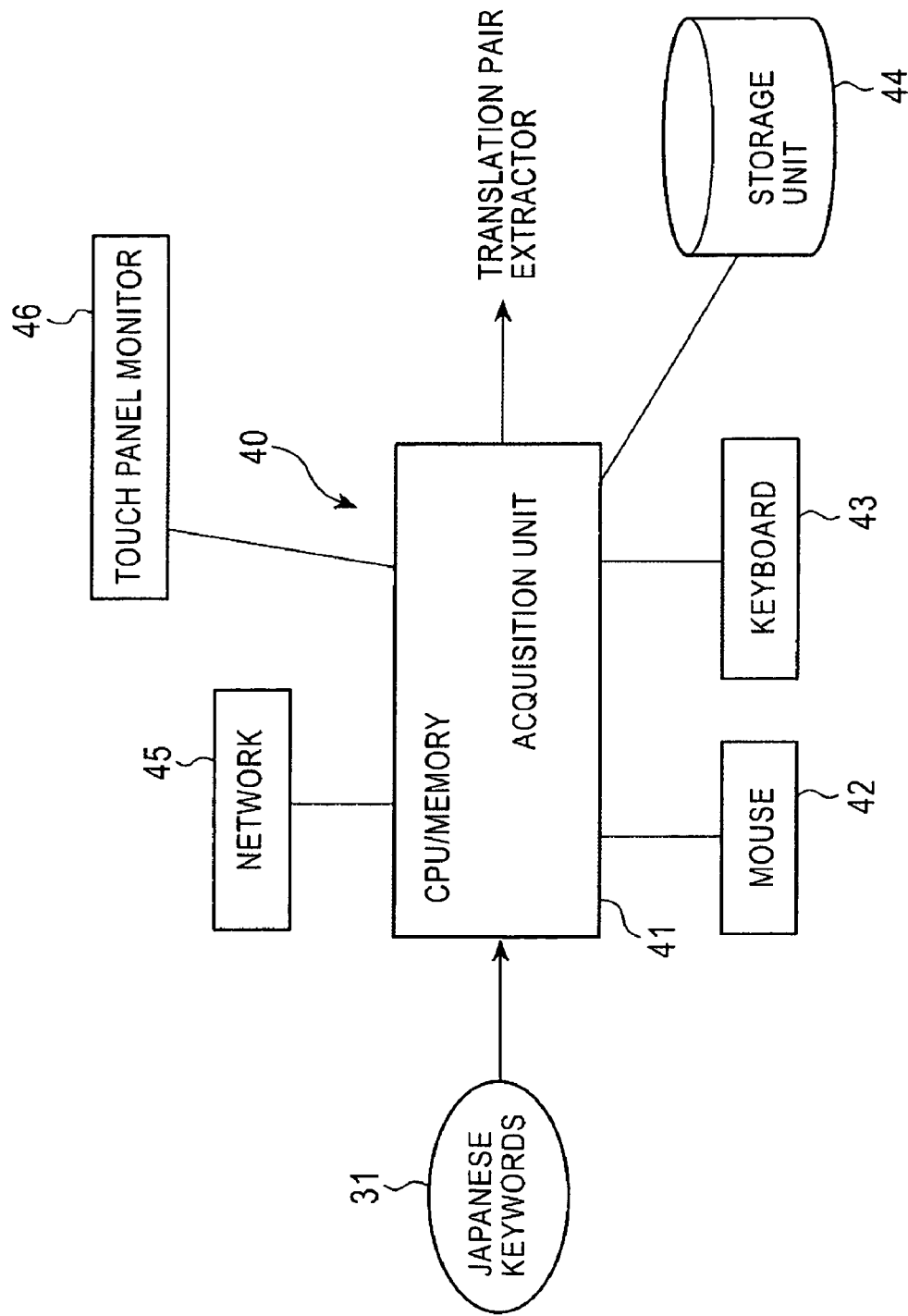
FIG. 8 is a block diagram of an input unit according to the present invention.

As shown in FIG. 8, the input unit (40) includes a CPU (41) and other parts connected to the CPU (41), such as a mouse (42), a keyboard (43) and a storage unit (44) such as a CD drive, a hard disk drive, a MO drive, or a floppy® disk drive. The input unit (40) may further include a memory used by the CPU (41).

A user can directly input keywords using the mouse (42) or the keyboard (43).

In the present invention, it is also possible to receive keywords from another computer server or the like via a network (45) such as the Internet or an intranet.

A touch panel monitor (46) known in the art may be used to provide a simpler input method.

Figure 9:
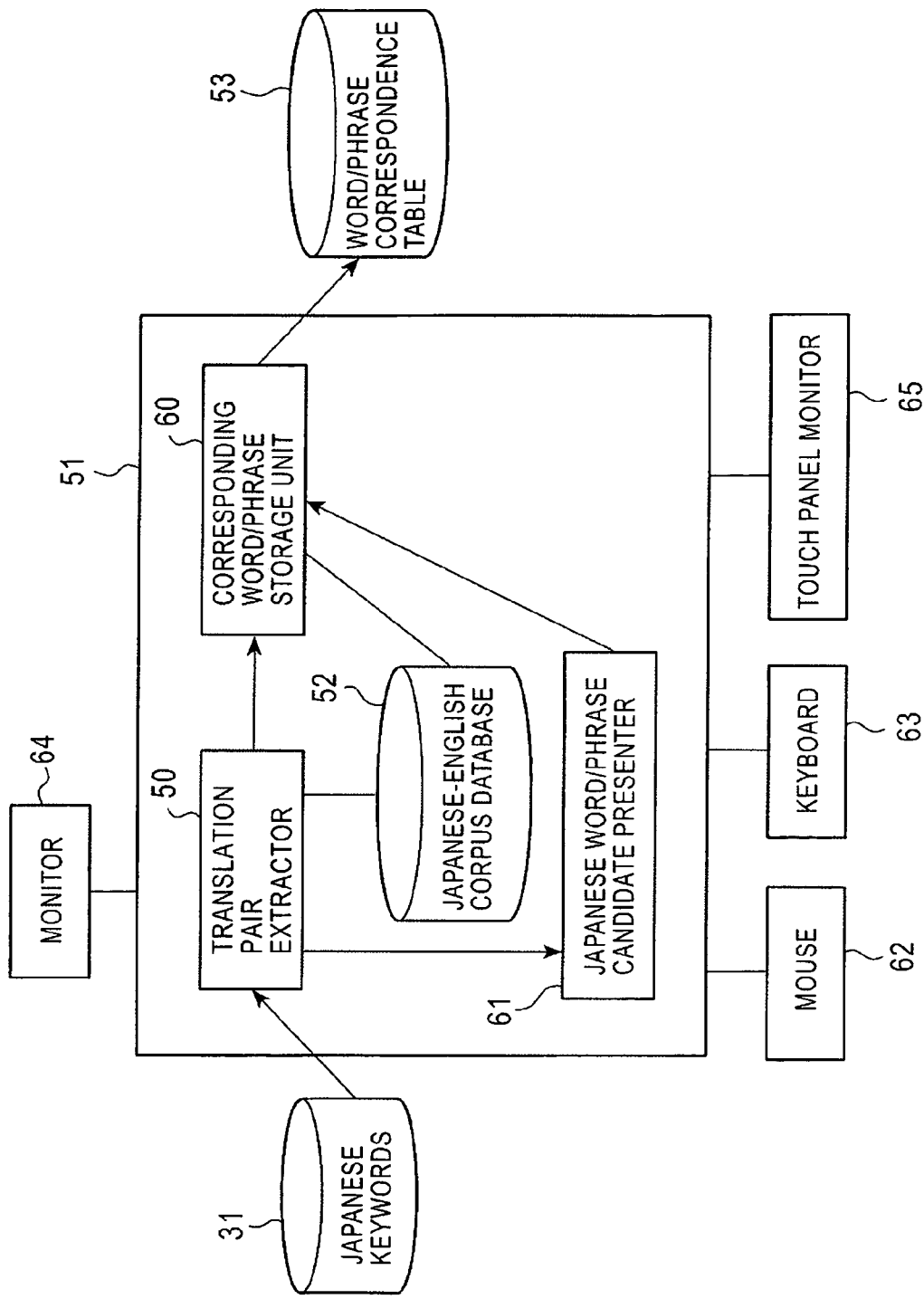
FIG. 9 is a block diagram of a translation pair extractor and a keyword-related phrase storage unit according to the present invention.

The input Japanese keywords (31) are transferred from the input unit (40) to the translation sentence pair extractor (50) and the keyword-related phrase storage unit (60) shown in FIG. 9.

In the present example, the translation pair extractor (50) and the keyword-related phrase storage unit (60) are included in the same processing unit (51). Note that processing is performed by the CPU in cooperation with a memory.

First, the translation pair extractor (50) extracts one or more sentence pairs including at least one of the Japanese keywords (31) from the parallel corpus database (52) stored in an external storage.

In a case in which a Japanese keyword (31) input by a user includes an adjective or a particle in addition to a main word or in a case in which two or more words(phrase) are input as a Japanese keyword (31), the keyword may be converted into a basic form or the two or more words may be divided into two or more keywords, by using a known language processing method such as a method based on morphological analysis.

In many cases, particles or adjectives play important roles when the keyword-related phrase storage unit (60) correctly extracts keyword-related words/phrases. Therefore, it is desirable to extract keyword-related words/phrases from the parallel corpus database (52), based on keywords including adjectives and/or particles. Based on particles, it is possible to identify the dependency relationship as will be described later. Adjectives often eliminate polysemy of words.

When no sentence pair including an input keyword is found from the parallel corpus database (52) in the sentence pair extraction step, the flow may return to the start. In this case, the input unit (40) prompt the user to input another similar keyword. Alternatively, the original keyword may be automatically converted into another similar keyword by using a thesaurus.

To this end, the processing unit (51) additionally includes a keyword modification unit (not shown) for properly modifying the keyword input via the input unit (40). In this process, if the given keyword includes two or more morphemes, the given keyword is divided into respective morphemes by using a known morphological analysis method thereby obtaining a keyword including no conjunctive particle or case particle. For example, when "否定的な (hiteiteki na)" is given, "な (na)" may can be removed.

Conversely, a conjunctive particle or a case particle may be added to an original keyword such if the resultant keyword is more suitable in searching for sentence pairs from the parallel corpus.

A thesaurus may be stored in the storage means, and part or all of morphemes of a given keyword may be replaced in accordance with the thesaurus.

The keyword-related phrase storage unit (60) extracts English phrases corresponding to the Japanese phrases each including a Japanese keyword from the sentence pairs extracted by the translation pair extractor (50), based on the partial correspondence information, and the keyword-related phrase storage unit (60) stores the extracted English phrases in a keyword-related phrase table (53). In the specific example shown in FIG. 7, "to the park", "I went", and "with her" are stored in the keyword-related phrase table (53).

Figure 10:
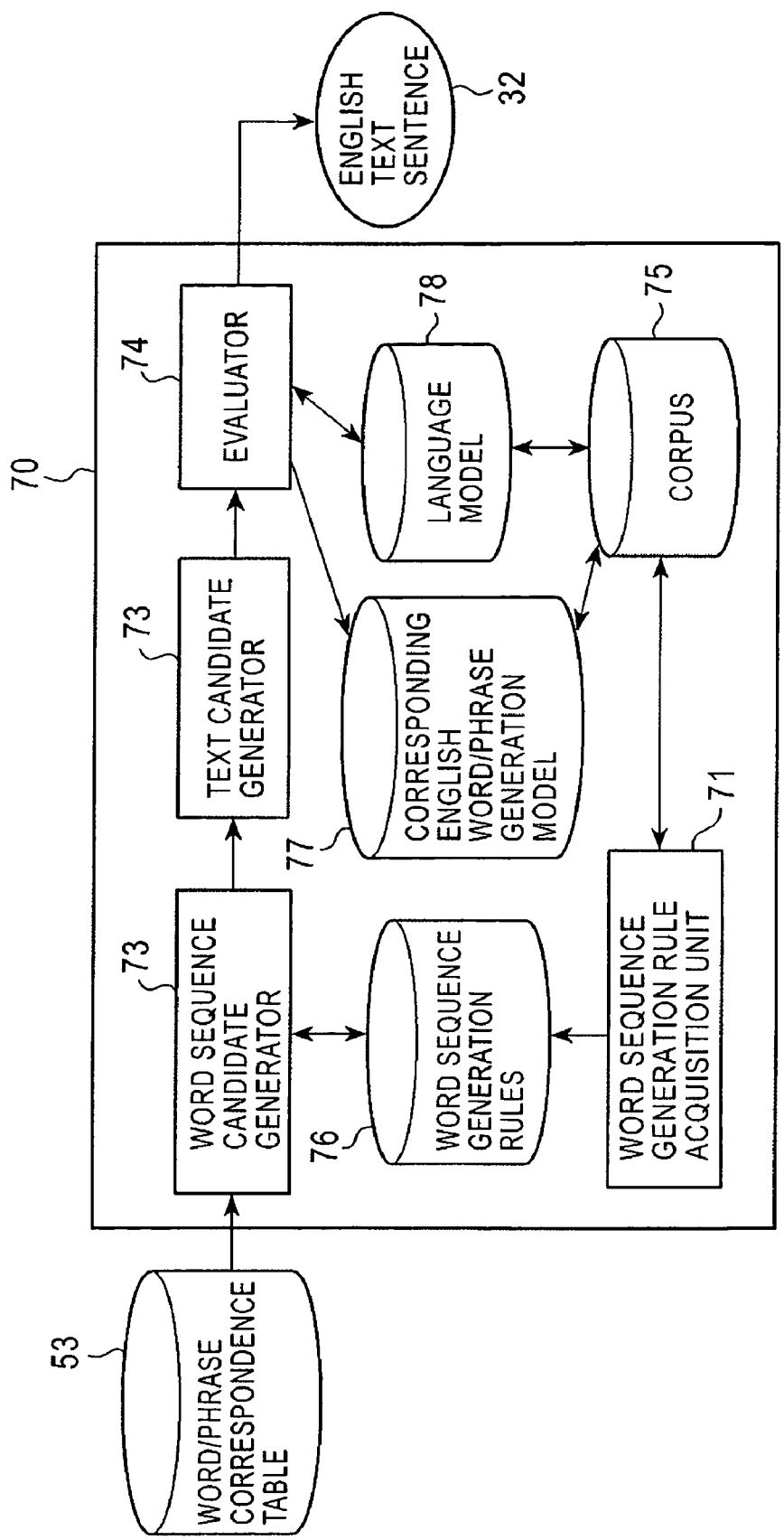
FIG. 10 is a block diagram of a text generator according to the present invention.

The obtained keyword-related phrase table (53) is input to the text generator (70) shown in FIG. 10 to generate an English text sentence.

A specific example of a technique to, when some words are input, generate a text sentence including the input words is disclosed by the present applicant in Japanese Unexamined Patent Application No. 2003-271592 cited earlier. This technique is used in the present invention to generate text sentences in the target language such as English.

FIG. 10 shows a specific example of a configuration of the text generator (70). The text generator (70) can be realized, for example, using a personal computer including a CPU and an external storage unit such as a hard disk. The processing is performed mainly by the CPU and results are stored in a memory or the external storage unit.

In the present example, when a given English keyword-related phrase is not a word sequence but a content word which can serve as a subject in a word sequence, a word sequence candidate is generated before a text candidate generator (73) generates a text sentence candidate, because there is a possibility that when the given English keyword-related phrase includes only a content word, the text candidate generator (73) cannot correctly determine the dependency relationship with other English keyword-related phrases and thus cannot generate a correct text sentence.

In the word sequence generation process, English keyword-related phrase (53) is used in a process performed by a word sequence generation rule acquisition unit (71) and a process performed by a word sequence candidate generator (72). Hereinafter, of English keyword-related phrases (53), those which include only a content word which can serve as a subject of a word sequence will be referred to as English keyword-related words. When a given English keyword-related phrase (53) is an English keyword-related word, the English keyword-related word is processed by the word sequence candidate generator (72), while when the given English keyword-related phrase (53) is not an English keyword-related word, the English keyword-related phrase (53) is transferred to the text candidate generator (73).

A word is regarded as a content word when the part of speech of the word is a verb, an adjective, a noun, a demonstrative, an adverb, a conjunction, an attribute, or an exclamation or when the word consists of an undefined morpheme, but otherwise the word is regarded as a functional word.

When English keyword-related words are given, the word sequence generation rule acquisition unit (71) searches for sentence pairs including each English keyword-related word from the parallel corpus (75) and performs morphological analysis and syntactic analysis (dependency analysis).

The word sequence generation rule acquisition unit (71) extracts word sequences including each English keyword-related word from the sentence pairs, and acquires a word sequence generation rule (76) indicating how to generate an English keyword-related phrase (53) from an English keyword-related word. The acquired word sequence generation rule (76) is stored. Since the word sequence generation rule is acquired from the parallel corpus (75), a Japanese word corresponding to the English keyword-related word can be simultaneously generated.

For example, "before the end of 1995/一九九五年中の (1995 nen chu no)" is acquired from "1995", and "to the possibility/可能性に (kanousei ni)" is acquired from "possibility". Those acquired word sequence generation rules (76) are stored.

In the example described above, pairs of an English keyword-related phrase and a Japanese keyword-related phrase are generated from English keyword-related words. Alternatively, pairs of an English keyword-related phrase and a Japanese keyword-related phrase may be generated from Japanese keywords.

Word sequence generation rules can be automatically acquired as follows. When a set of English keyword-related phrases is denoted by V, and a set of rules indicating how to generate a word sequence from an English keyword-related phrase k (∈ V) is denoted by Rk, the rule rk (∈ Rk) can be represented in the following form:

$$k \to h_k \, m^*$$

where hk denotes subject morphemes including an English keyword-related phrase, and m* denotes an arbitrary number of successive morphemes that are included in the same word sequence and that are located immediately after hk. When an English keyword-related word is given, a rule that satisfies the above-described form is automatically acquired from the corpus (75) in the target language.

The word sequence candidate generator (72) generates word sequence candidates to be included in an English text sentence (32) to be output, from input English keyword-related words (53) in accordance with the word sequence generation rules (76). When a Japanese text sentence is also output, Japanese word sequence candidates are also generated in the above process.

For example, when "1995" is given, it is not so easy to be a word sequence from which to generate a natural text sentence. Thus, a word sequence for use in the text sentence generation process, such as "before the end of 1995" or "in 1995", is generated by adding words having a close relation with "1995" to "1995".

In the present example, as described above, the word sequence generation rule acquisition unit (71) acquires a word sequence generation rule indicating how to generate a word sequence from an English keyword-related word (53) (and Japanese keyword-related word) based on the parallel corpus (75). Thus, the word sequence generation rule can be efficiently generated with a minimum amount of computation. This contributes to an improvement in processing speed.

Note that it is not necessarily needed to extract words associated with an English keyword-related phrase from the corpus, but arbitrary words may be added to an input English keyword-related word (53) although a high computational power is required. Alternatively, a bilingual dictionary database may be prepared, and a word sequence may be generated from idiomatic expressions included in the bilingual dictionary database. For example, when "possibility" is given, "to the possibility" may be acquired from the bilingual dictionary database.

In Japanese, a subject is often omitted. In such a case, a subject is added when a word sequence candidate is generated. For example, when "response" is given, "He responded" can be acquired. In Japanese, a subject is omitted when it is clear what is the subject. A formal subject is also often omitted. Thus, when there is no subject, "It is responded that" may be generated from "respond" without generating "He responded".

A text sentence candidate is then generated by the text candidate generator (73). The text sentence candidate is expressed in the form of a graph or a tree. For example, when "to the park", "I went . . . ", and "with her" are given as English keyword-related phrases (53), a text sentence candidate is expressed as follows.

Figure 11:
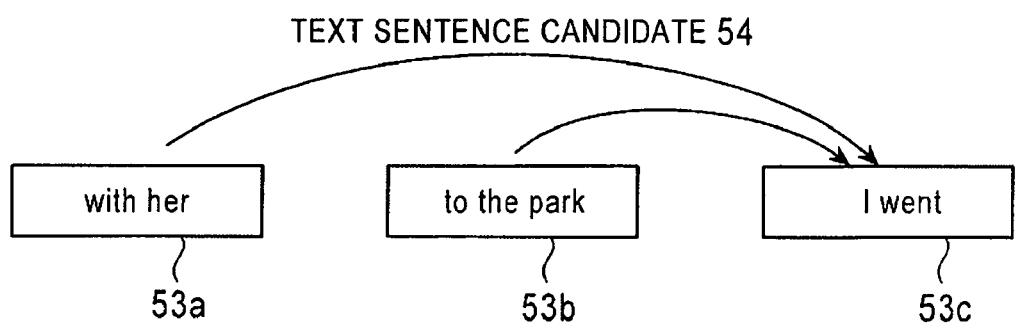
FIG. 11 is a diagram showing an example of a manner in which a text sentence is generated from English keyword-related phrases.

That is, as shown in FIG. 11, dependency relations among English keyword-related phrases (53a), (53b), and (53c) are assumed, and a text sentence candidate (54) is generated in the form of the dependency structure tree whose elements are given by the respective English keyword-related phrases. In the case in which there are three phrases, the number of possible manners of dependency among three phrases is equal to 3!×2=12. The number of manners of dependency can be reduced by taking into account the grammar or property of the target language.

The generated text sentence candidates (54) are evaluated by an evaluator (74) based on an English keyword-related phrase generation model (77) obtained via learning of the corpus or a language model (78), and scores are given to the respective text sentence candidates (54).

Figure 12:
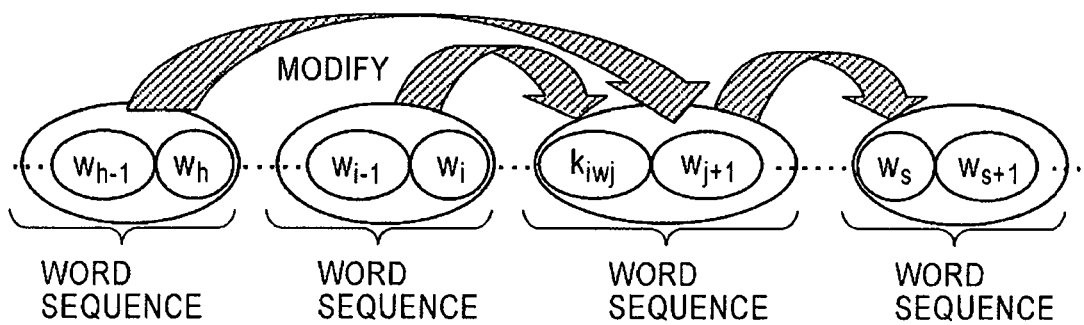
FIG. 12 is a diagram showing the relationships between English keyword-related phrases and word sequences.

The English keyword-related phrase generation model (77) and the language model (78) based on a morpheme model and a dependency model are described in further detail below. The English keyword-related phrase generation model is based on models (KM1 to KM5) depending on the type of information used, as described below. In the following discussion, it is assumed that the set of English keyword-related phrases V consists of subject words that appear as a greater number of times in the corpus than a predetermined value, and word sequences can be expressed in the above-described form. It is also assumed that English keyword-related words independent of each other, and when a text sentence consisting of a word sequence $w_1 \ldots w_m$ is given English keyword-related words correspond to words $w_j$ ($1 \leq j \leq m$). FIG. 12 shows the model.

[KM1] Two words before a word of interest are taken into account (trigram).

It is assumed that $k_i$ depends only on two words $w_{j-1}$ and $w_{j-2}$ located before $k_i$.

$$P(K \mid M, D, T) = \prod_{i=1}^{n} P(k_i \mid w_{j-1}, w_{j-2})$$

[KM2] Two words after a word of interest are taken into account (backward trigram).

It is assumed that $k_i$ is related only to two words $w_{j+1}$ and $w_{j+2}$ located after $k_i$.

$$P(K \mid M, D, T) = \prod_{i=1}^{n} P(k_i \mid w_{j+1}, w_{j+2})$$

[KM3] A modifying word sequence is taken into account (modifying word sequence).

When there is a word sequence that modifies a word sequence including $k_i$, $k_i$ is assumed to be related only to two words $w_l$ and $w_{l-1}$ located at the end of the modifying word sequence (See FIG. 12).

$$P(K \mid M, D, T) = \prod_{i=1}^{n} P(k_i \mid w_l, w_{l-1})$$

[KM4] A modified word sequence is taken into account (modified word sequence).

When there is a word sequence that is modified by a word sequence including $k_i$, $k_i$ is assumed to be related only to two words $w_s$, and $w_{s+1}$ in the modified word sequence (See FIG. 12).

$$P(K \mid M, D, T) = \prod_{i=1}^{n} P(k_i \mid w_s, w_{s+1})$$

[KM5] Up to two modifying word sequences are taken into account (two modifying word sequences).

When there are word sequences that modify a word sequence including $k_i$, $k_i$ is assumed to be related only to two words $w_l$, and $w_{l-1}$ located at the end of a modifying word sequence closest to the end of a sentence and two words $w_h$ and $w_{h-1}$ located at the end of a modifying word sequence closest to the beginning of the sentence (FIG. 12).

$$P(K \mid M, D, T) = \prod_{i=1}^{n} P(k_i \mid w_l, w_{l-1}, w_h, w_{h-1})$$

Now, the morpheme model (MM) is discussed. Herein, it is assumed that one grammatical attribute is given to each morpheme. When a text sentence, that is, a character string is given, the model determines a probability value indicating the likelihood that the given character string is a morpheme and it has a {j}th (1≦j≦l) grammatical attribute.

When a text sentence T is given, if morphemes $m_i$ (1≦i≦n) are independent, the probability that an ordered set of morphemes M is obtained is given by:

$$P(M \mid T) = \prod_{i=1}^{n} P(m_i \mid m_1^{i-1}, T)$$

where $m_i$ indicates one of 1st to {l}th grammatical attributes.

On the other hand, in the dependency model (DM), when a text sentence T and an ordered set of morphemes M are given, if dependencies $d_1 \ldots d_n$ are independent, the probability that an ordered set of dependencies D associated with respective word sequences is obtained is given by:

$$P(D \mid M, T) = \prod_{i=1}^{n} P(d_i \mid M, T)$$

For example, when three English keyword-related phrases (53), "to the park", "I went", and "with her" are given, if two candidates "I went with her to the park." and "I went to the park with her" are generated from the three English keyword-related phrases (53), a candidate with a greater likelihood score calculated based on the dependency model is selected.

In the present example, the evaluator (74) evaluates the text sentence candidates (54) using the models described above.

In the evaluation performed by the evaluator (74) based on the above-described method, dependency among phrases and the likelihood in terms of arrangement of morphemes are taken into account. Thus, a correct form in terms of, for example, the presence/absence of a suffix "s" for the third person singular has a high score in the evaluation. This means that the grammatical accuracy is also evaluated in the evaluation.

A text sentence candidate with a highest score, text sentence candidates with score greater than a predetermined threshold, or as many text sentence candidates with highest scores as a predetermined number N are converted into surface sentences and output.

The resultant sentences are output from the output unit (80) such that they are displayed on a monitor, a synthesized voice is output, or electronic data is output to a language processing system such as a translation system. If necessary, text sentence data indicating the resultant sentences may be transmitted to another computer connected to the apparatus via a network.

Finally, for the English text sentence (32) generated by the apparatus/method according to the present invention, a grammatical correction process may be performed. Although a certain degree of grammatical accuracy is achieved in the generated sentences as described above, there is a possibility that grammatical errors such as an error in terms of tense or a lack of a preposition or a subject occur. One method of correcting such errors is to use a known error correction technique used in the OCR (optical character recognition).

When an English sentence has an error in terms of tense (represented in perfect tense, progressive form, etc.) or modality (represented by "may", "can", or "must"), the error may be corrected, for example, using a technique disclosed in Japanese Patent No. 3388393 granted to the present applicant.

For example, "彼女と公園に行った (Kanojo to kouen he itta.)" is determined as being in the past tense, and a corresponding English sentence must be in the past tense. If not so, an error is corrected. "彼女と公園に行ってきたところだ (Kanojo to kouen ni ittekita tokoro da.)" is determined as being in the present perfect tense, and a corresponding English sentence must be in the present perfect tense. For a Japanese sentence "彼女と公園へ行くだろう (Kanojo to kouen he iku darou.)", "may" must be used in a corresponding English sentence.

Machine learning may be performed in terms of grammatical error patterns, and errors in terms of the suffix "s" to verbs in the present tense in sentences in which the subject is third person singular or errors in terms of prepositions may be detected and corrected by mentioned below document 1.

[Document 1]

Emi Izumi, Kiyotaka Uchimoto, Toyomi Saiga, Thepchai Supnithi, and Hitoshi Isashara, "Automatic Error Detection in the Japanese Learners' English Spoken Data", Proceedings of the ACL2003 Interactive Poster/Demo Sessions pp. 145-148, 2003.

EXAMPLE 2

Figure 3:
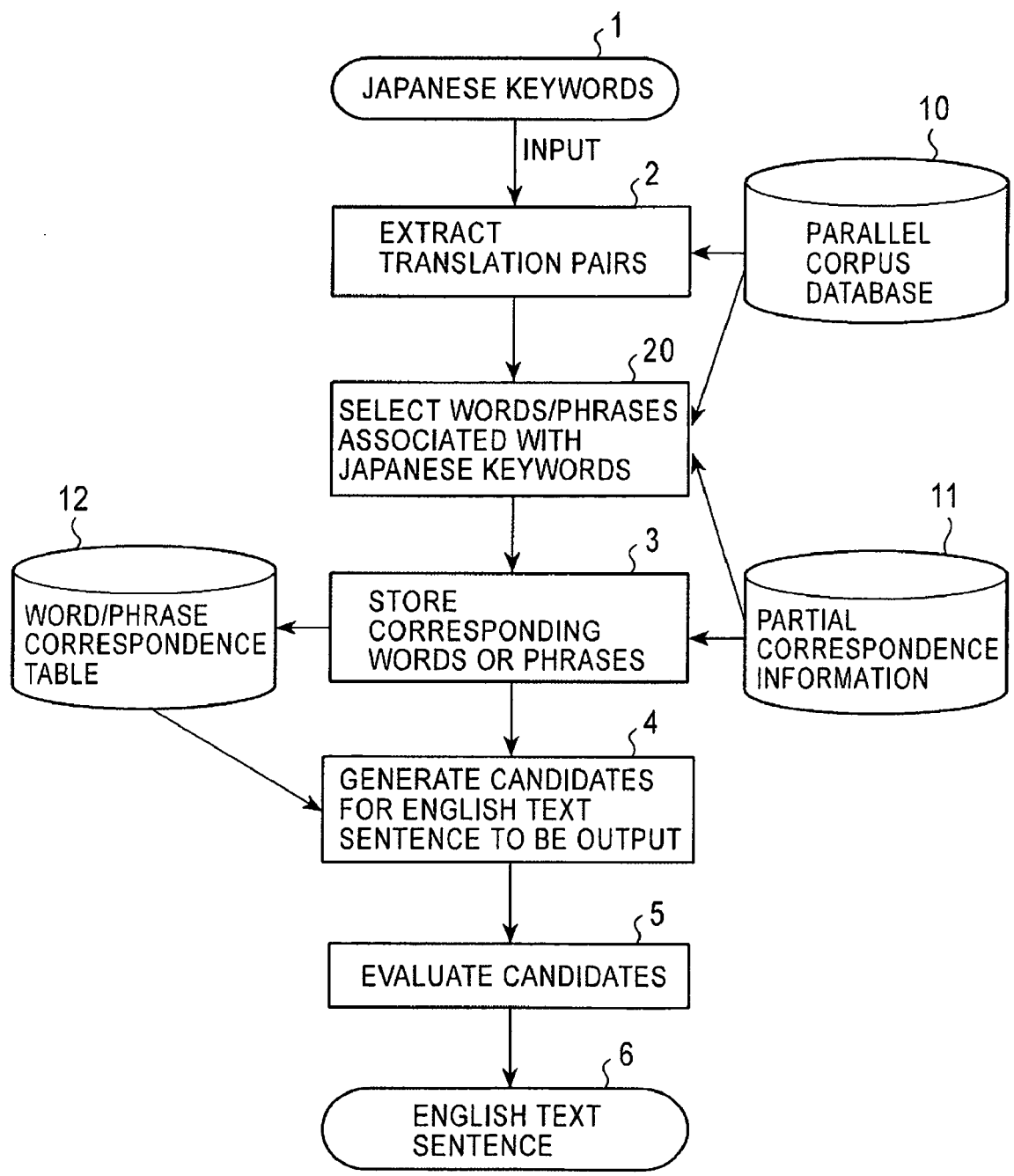
FIG. 3 is a flow chart associated with a text sentence generation method according to example 2 of the present invention.

FIG. 3 is a flow chart showing processing according to example 2 of the present invention. In the example 2, when a plurality of sentence pairs are extracted (2) for an input Japanese keyword (1), if two or more different Japanese phrases related to the Japanese keyword (1) are extracted from the partial correspondence information associated with the sentence pairs, a correct Japanese keyword-related phrase is selected (20).

The process is described in further detail with reference to FIG. 9. The translation pair extractor (50) extracts sentence pairs including a Japanese keyword (31) from the parallel corpus database (52). For example, when "彼女 (kanojo)" is input as a keyword, if "彼女が (kanojo ga)", "彼女と (kanojo to)", and "彼女に (kanojo ni)" are extracted as Japanese keyword-related phrases from a plurality of sentence pairs. Then a Japanese phrase candidate presenter (61) presents to a user all these extracted Japanese keyword-related phrases. In response, the user selects a best one from the presented phrases.

More specifically, the extracted Japanese keyword-related phrases are displayed on the monitor (64), and the user selects a best phrase using the mouse (62) or the keyboard (63). A touch panel monitor (65) may be used to provide a good user interface for the same purpose.

In this specific example, when "公園 (kouen)" is input, "公園へ (kouen he)/to the park" and "公園で (kouen de)/in the part" are presented as candidates. When "行く (iku)" is input, "行く (iku)/I will go" and "行った (itta)/I went" are presented as candidates. As described above, each time a user inputs a Japanese keyword, Japanese keyword-related phrases are extracted from the parallel corpus database (10) and presented to the user such that the user can select a best one from the presented phrases. This allows the user to easily specify correct Japanese phrases, and specifying correct Japanese phrases makes it possible to generate a correct text sentence.

It is known in the art to, in response to inputting of a first character in alphabet or Japanese kana, display all word sequences that begin with the input character. For example, when "k" is input, word sequences such as "彼は (kare ha)", "彼女は (kanojo ha)", "今日 (kyou)", etc. are displayed. When "an" is input following "k" and thus "kan" is input, displayed word sequences are narrowed down to "彼女と (kanojo to)", "彼女が (kanojo ga)", etc. In a case in which it is difficult to directly extract Japanese keyword-related phrases from the parallel corpus database each time one character is input during the inputting of a Japanese keyword, words which begin with the input character(s) may be extracted from a dictionary database prepared separately from the parallel corpus database, and Japanese phrase including each word may be extracted from the parallel corpus database.

EXAMPLE 3

Figure 4:
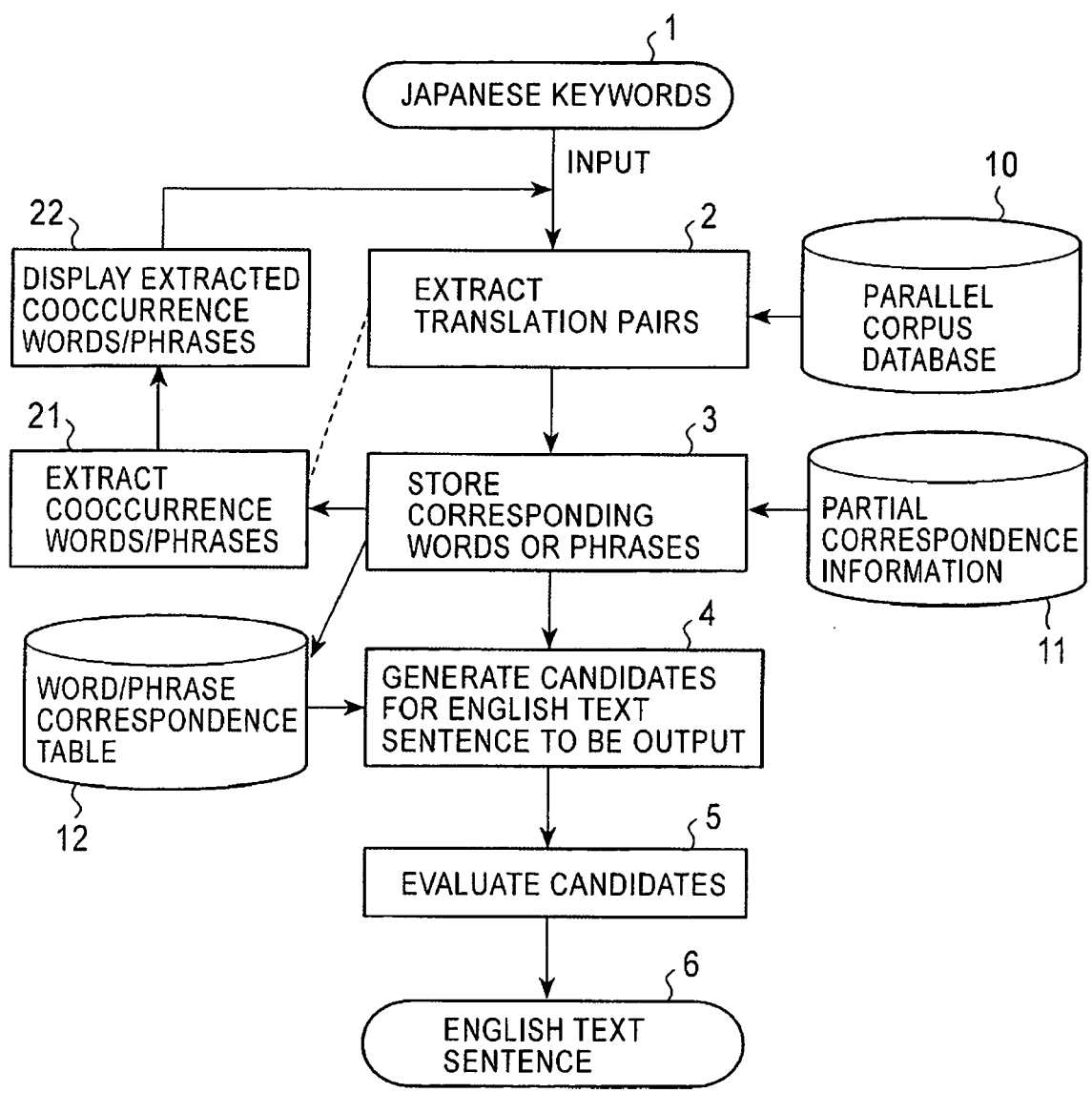
FIG. 4 is a flow chart associated with a text sentence generation method according to example 3 of the present invention.

FIG. 4 is a flow chart showing processing according to example 3 of the present invention. In example 3, when a sentence pair is extracted (2), phrases that co-occur with a keyword are extracted from the sentence pair (21). The extracted co-occurring phrases are presented to a user (22). If the user selects a co-occurring phrase, the selected phrase is employed as a new keyword (1).

Figure 13:
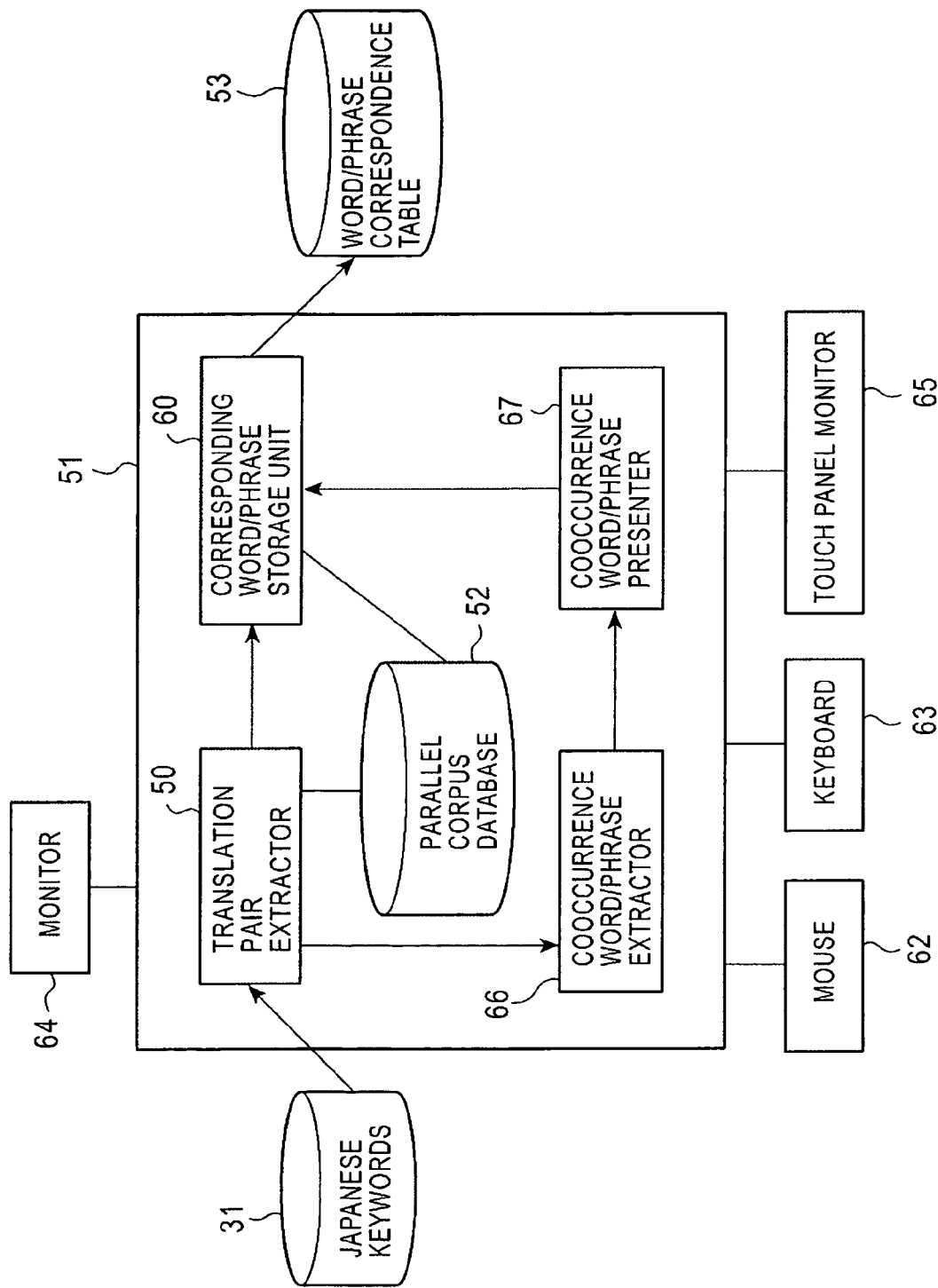
FIG. 13 is a block diagram of a text generator according to an example of the present invention.

For example, as shown in FIG. 13, at the point of time at which Japanese keywords "彼女 (kanojo)" and "公園 (kouen)" have been input, the sentence pair extractor (50) extracts a sentence pair "彼女と公園に行った (Kanojo to kouen he itta)/I went to the park with her", and the co-occurring phrase extractor (66) extracts "行った (itta)" as a co-occurring phrase that co-occurs with "彼女と (kanojo to)" and "公園へ (kouen he)". Techniques to extract co-occurring phrases are known in the art.

A co-occurring phrase presenter (67) presents "行った (itta)" to the user by displaying it on the monitor (64). When the user determines to employ it as a new keyword, the user selects it using the mouse (62) or the keyboard (63) thereby inputting it to the translation pair extractor (50) or the word/phrase pair storage unit (60) stores "公園へ (kouen he)/ to the park" in a keyword-related phrase table (53).

In the former case, a further phrase that co-occurs with the selected co-occurring phrase may be selected. However, this results in a great increase in the number of extracted sentence pairs. In the latter case, such an increase does not occur.

EXAMPLE 4

Figure 5:
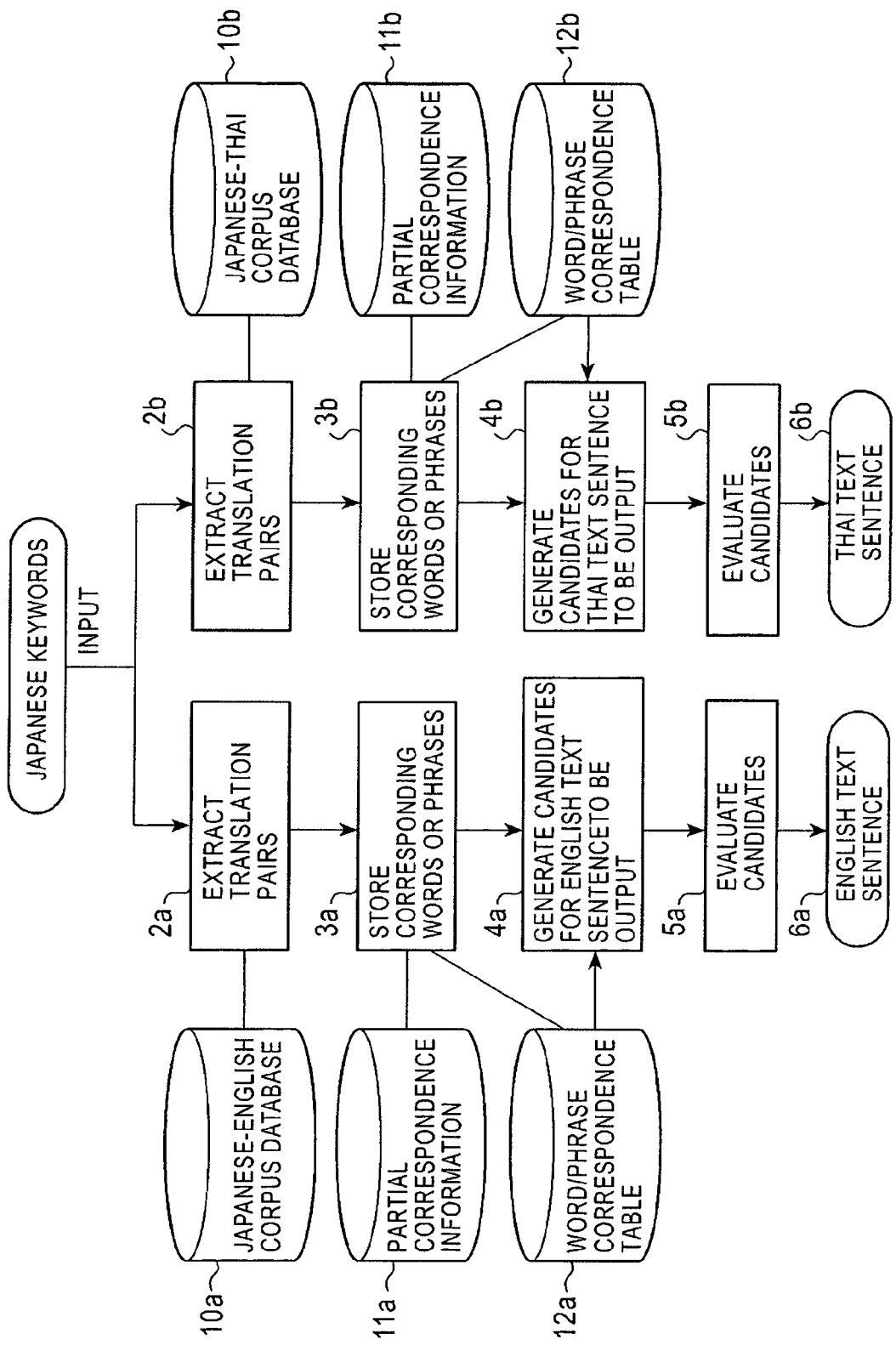
FIG. 5 is a flow chart associated with a text sentence generation method according to example 4 of the present invention.

In Example 4 of the present invention, as shown in FIG. 5, when a Japanese keyword is input, text sentences in two different target languages are generated at the same time.

In the example shown in FIG. 5, Japanese-English sentence pairs are extracted (2a) from a Japanese-English corpus database (10a), and Japanese-Thai sentence pairs are extracted (2b) from a Japanese-Thai corpus database (10b). Keyword-related phrases are extracted from respective partial correspondence information (11a) and (11b) and the extracted keyword-related phrases are stored (3a), (3b) in keyword-related phrase tables (12a) and (12b), respectively. Text sentence candidates are generated (4a), (4b) from keyword-related phrases stored in the keyword-related phrase tables (12a) and (12b). The generated text sentence candidates are evaluated (5a), (5b), and properly selected English text sentence (6a) and Thai text sentence (6b) are output at the same time.

The processing methods employed in the examples 1 to 3 described above may also be employed in this example 4.

The example 4 is very useful in particular when a user communicates via a network with a plurality of other users who speak different languages, because text sentences in different languages are output at the same time.

EXAMPLE 5

In example 5, Japanese text sentence candidates and English text sentence candidates are generated at the time in the text sentence candidate generation step, and generated text sentence candidates are presented to a user. This allows the user to easily recognize what has been generated as the text sentence in the target language by reading the corresponding Japanese text sentence.

Figure 6:
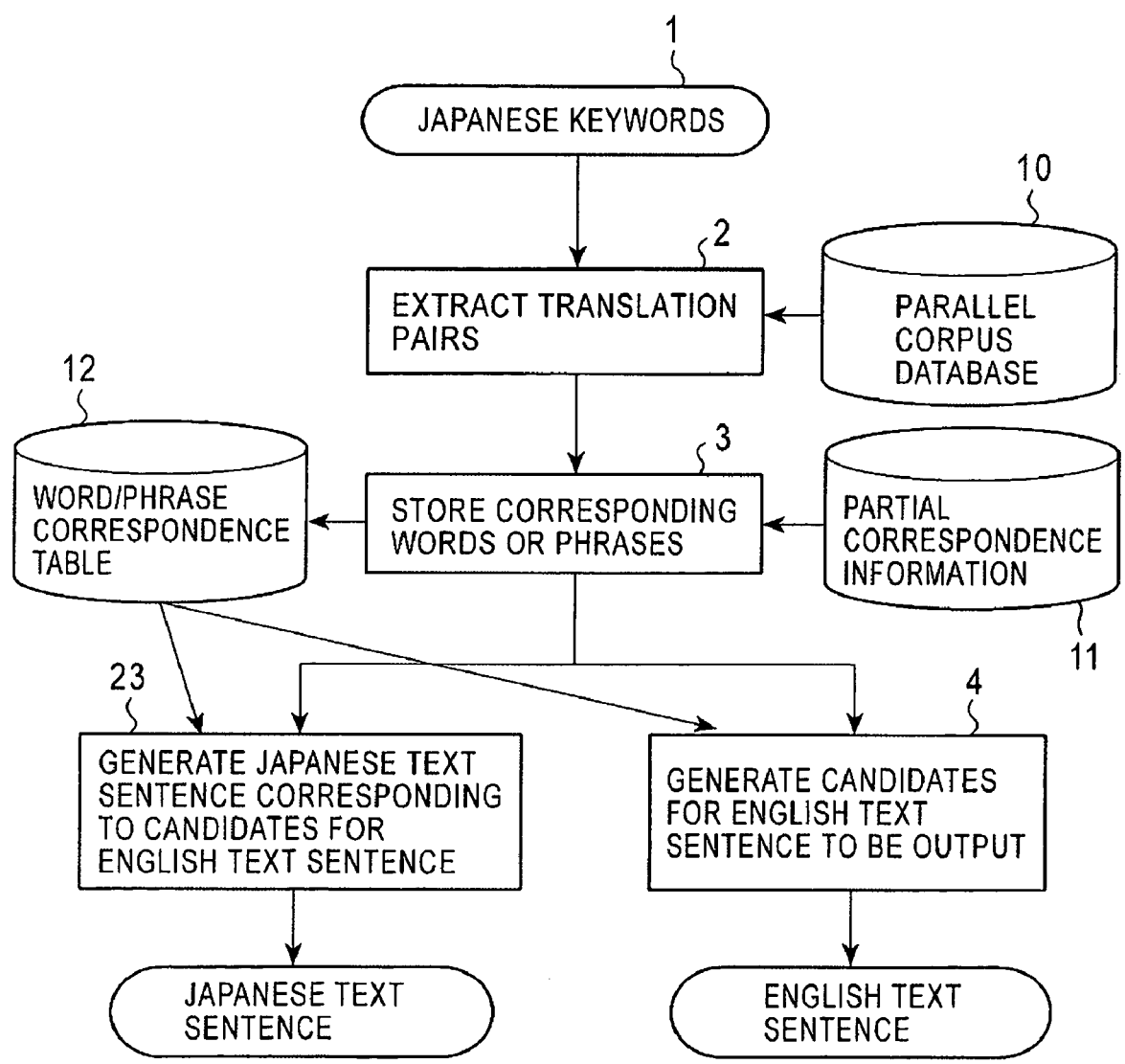
FIG. 6 is a flow chart associated with a text sentence generation method according to example 5 of the present invention.

As shown in FIG. 6, when keyword-related phrases are stored (3), pairs of Japanese and English keyword-related phrases are stored in the keyword-related phrase table (12), and Japanese text sentence candidates are generated when English text sentence candidates are generated (23). If the same dependency relationships among phrases are assumed for both languages, the generated text sentences in both languages are equivalent to each other. Thus, the user can understand the meaning of the English text sentence by reading the corresponding Japanese text sentence.

In this method, the user can select Japanese phrases that are correct in terms of dependency relationship thereby correctly specifying dependency relationships among English phrases. This makes it possible to generate a natural text sentence in which dependency relationships are correctly represented, based on English phrases.

EXAMPLE 6

Figure 14:
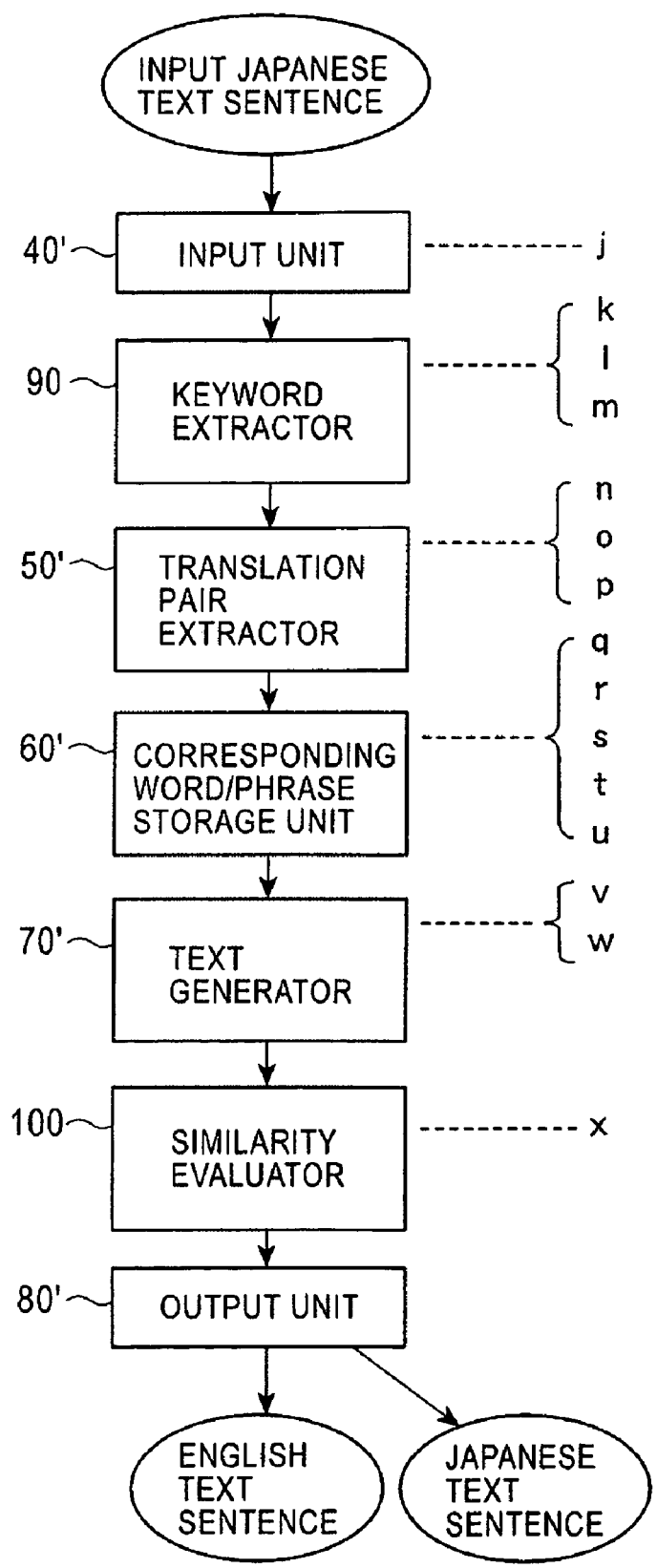
FIG. 14 is a flow chart associated with a text sentence generation method according to example 6 of the present invention.
Figure 15:
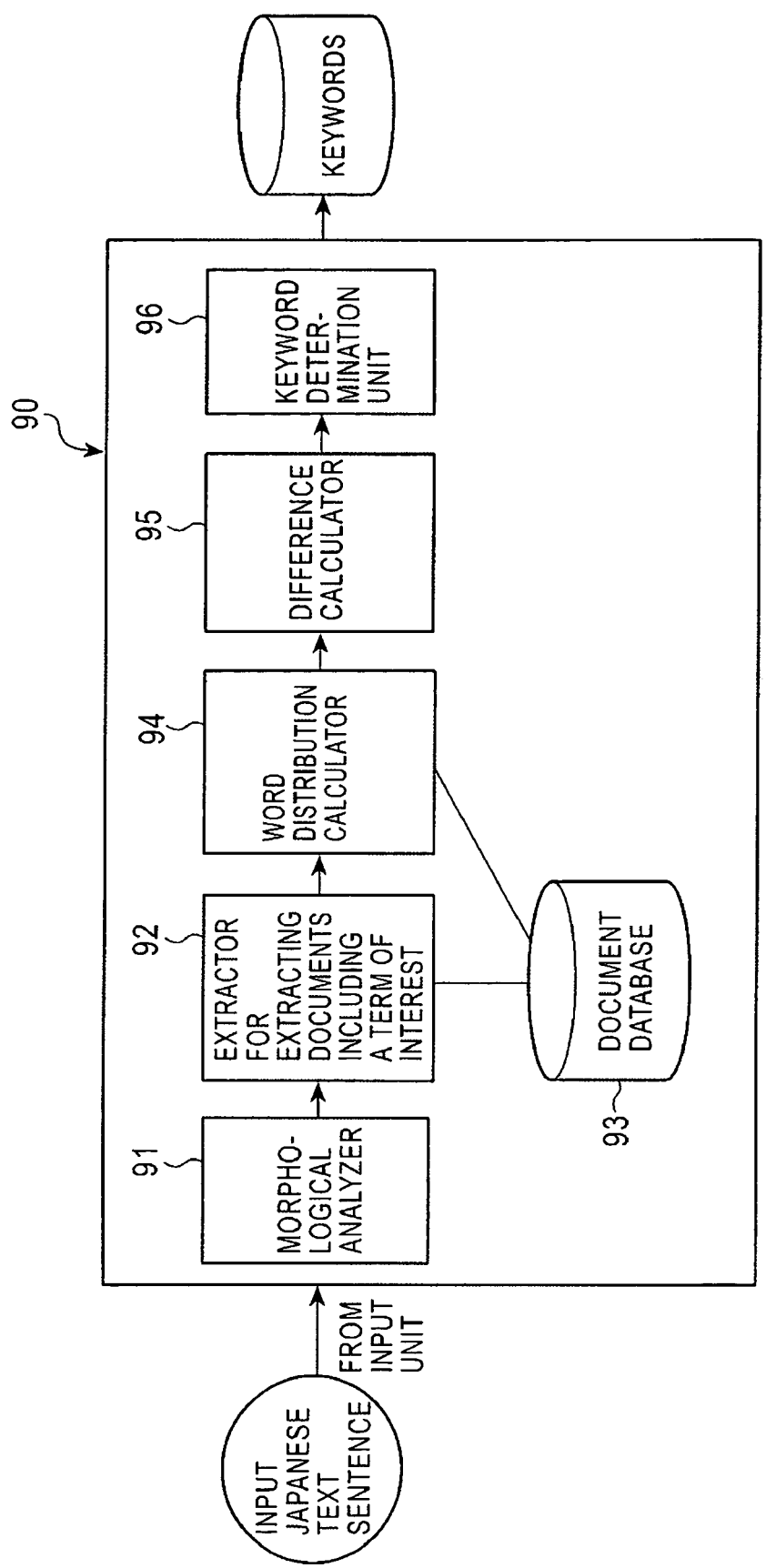
FIG. 15 is a block diagram of a text generator (example 6) of the present invention.

In the examples described above, Japanese keywords are directly input. The present invention can be implemented below mentioned system and used. That is, in this system, as shown in FIG. 14, a user inputs not Japanese keywords but a Japanese text sentence. For example, if the user inputs" "彼女と公園に行った (Kanojo ha kouen he itta)" via an input unit (40)' (similar to the input unit (40) except that a text sentence is input instead of keywords), a keyword extractor (90) extracts keywords as shown in FIG. 15.

FIG. 5 shows an example of a configuration of the keyword extractor (90). In this keyword extractor (90), processing is performed by a CPU in cooperation with a memory. The keyword extractor (90) extracts keywords playing an important role in representing the content of the text sentence from the input Japanese text sentence.

Various techniques to extract keywords are known and actually used in generating a summary of a document or in document searching. Any of these techniques can be used in the present example. By way of example, a technique is used herein which is disclosed in document 2 mentioned below.

[Document 2]

"Measuring of Representativeness of Terms", Tohru Hisamitsu, Yoshiki Niwa, and Junichi Tsujii, Technical Report of Special Interest Group of Natural Language Processing, Information Processing Society of Japan, 1999-NL-133.

In this method, the news hook of a word, or representativeness (in the description, it is called characteristicity) of words appearing in a document is numerically measured in order to select a characteristic word, and keywords are selected based on the measurement result. Thus, this method can be advantageously used in the present invention. The method is briefly described below.

First, in the keyword extractor (90), a morphological analyzer (91) morphologically analyzes a given Japanese text sentence by using a known morphological analysis method. The morphemes acquired via the analysis are stored in the form of a morpheme table in a memory or an external storage unit which is not shown.

Morphemes stored in the morpheme table are read one by one, and the characterisity of each morpheme (hereinafter, also referred to as a term of interest) is measured.

A document extractor (92) extracts all documents including the term of interest W from a particular document database (93). The document database (93) includes a plurality of documents in Japanese (source language) and is stored in an external storage unit or the like. A Japanese corpus or a Japanese part of a Japanese-English corpus may be used as the document database (93).

A word distribution calculator (94) calculates the word distribution over a set of documents including the term of interest W and also calculates the word distribution over all documents included in the document database (93). The word distribution calculator (94) then measures the degree of difference between the two word distributions.

More specifically, the degree of difference is calculated by a difference calculator (95) as described below.

The term of interest is denoted by W, the set of all documents including W is denoted by D(W), the set of all documents is denoted by $D_o$, and the word distribution in D(W) is denoted by $P_{D(W)}$, and characterisity of the word W are defined Rep(W) as words distribution $P_o$ in $D_0$ are defined using the distance Dist$\{P_{D(W)}, Po\}$ between the two distributions $\{P_{D(W)}, Po\}$.

In the present example, the distance between the two word distributions is measured using a log likelihood ratio. That is, when a set of all words is denoted by $\{W_1, \ldots, W_n\}$, the frequency of occurrence of a word $W_i$ in D(W) and $D_o$ are respectively denoted by $k_i$ and $K_i$, the distance Dist$(P_{D(W)}, Po\}$ between $P_{D(W)}$ and Po is defined as follows:

$$\text{Dist}(P_{D(W)}, P_0) = \sum_{i=1}^{n} k_i \log \frac{k_i}{\#D(W)} \sum_{i=1}^{n} k_i \log \frac{K_i}{\#D_0}.$$

where #D(W) is the number of words of the term of interest W included in D(W), and #Do is the number of words included in all documents. The definition according to the above formula has a difficulty in comparing the representativeness of terms whose #D(W) is greatly different. To avoid the above difficulty, the representativeness Rep(W) is normalized as shown below:

$$Rep(W=Dist(P_{D(W)}, Po)/B(\#D(W))$$

where B(•) is an approximation function using an exponential function defined so as to obtain high accuracy in characterisity for a range in which #D(W) has proper values (for example, 1000≦#D(W)≦20000).

When #D(W) is very large as is the case with" "する (suru)/ do", the number of D(W) may be limited such that #D(W) ≦20000 is satisfied and thus the approximation function is effective. This also allows a reduction in the amount of computation.

In the keyword extractor (90), after completion of calculating the characterisity in the above-described manner, a keyword determination unit (96) extracts keywords from the input Japanese text sentence in accordance with a predetermined threshold value.

Thus, for example, "彼女 (kanojo)/She", "公園 (kouen)/ park", and "行く (iku)/go" are extracted as keywords. Thereafter, a translation pair extractor (50') extracts sentence pairs from the parallel corpus database (10) in a similar manner to the previous examples. Note that there is a possibility that other sentence pairs such as "彼女は動物園へ 行った (Kanojo ha doubutsuen he itta.)/She went to the zoo." are also extracted in the sentence pair extraction step.

Thereafter, the keyword-related storage unit (60') extracts and stores keyword-related phrases in a similar manner to the previous examples described above. A text sentence is then generated by the text generator (70').

Processing units (40'), (50'), (60') and (70') are similar to corresponding processing units (40), (50), (60), and (70) in the previous examples. These counterparts are similar in structure to each other unless otherwise noted.

In the text generator (70') having a similar structure to that of the text generator (70) shown in FIG. 10 used in the previous examples, text sentence candidates having a score greater than a threshold value is selected by the evaluator (74) and pairs of text sentences in Japanese and English are output as in the example 5. Finally, a similarity evaluator (100) evaluates the similarity between a Japanese text sentence in each output pairs of sentences and the original input Japanese text sentence.

A method of evaluating the similarity is to calculate the coincidence of character string between the two text sentences. Another method is to compare the result of a translation obtained by means of machine translation with the result of a translation performed by a human translator in units of character strings (or in units of words), and calculate the similarity based on the comparison result. A specific example of this technique is disclosed in document 3 mentioned below.

[Document 3]

"Bleu: a Method for Automatic Evaluation of Machine Translation", Kishore Papineni, Salim Roukos, Todd Ward, Wei-Jing Zhu, IBM Research Report, RC22176 (WO109-022), 2001.

For example, the similarity evaluator (100) evaluates the similarity of "彼女と公園に行った (Kanojo to kouen he itta)" and "彼女は公園へ行った (Kanojo ha kouen he itta)" generated by the text generator (70') relative to the original input text sentence "彼女は公園へ行った (Kanojo ha kouen he itta)", and selects more similar sentence of "彼女は公園へ行った (Kanojo ha kouen he itta)/She went to the park" and output it from the output unit (80').

The present invention has been described above with reference to examples 1 to 6. Although units (40), (50), (60), (70), and (80) were described separately for the convenience of explanation, these units may be implemented on a single personal computer or the like. In particular, it is desirable that a CPU, a memory, an input/output unit, a network adapter (not shown), and an external storage unit be shared by the units (40), (50), (60), (70), and (80) to simplify the apparatus.

The parallel corpus database (10) and the corpus (75) stored in the external storage unit may be realized using a part or all of a single database.

The parallel corpus database (10) and the corpus (75) are not necessarily needed to be stored in the external storage unit but data may be collected from a plurality of serves via a network.

The present invention has great advantages as described above. The present invention can provide a method of generating a text sentence in a target language different in a source language and an apparatus thereof that when one or more keyword in a source language are given, a text sentence in the target language is generated from keywords and can output, and the process of generating a text sentence is simple compared with the process of generating a text sentence from a text sentence in the source language, and it is possible to generate a very natural text sentence including no error which often occurs in the technique based on analysis of a text sentence in the source language.

Additionally, The present invention can provide a method of generating a text sentence in a target language different in a source language and an apparatus thereof that keyword-related words/phrases in the source language are presented to a user, the presentation of the words/phrases in the source language allows the user to easily understand the words/phrases and select a correct word/phrase, the selection of the correct keyword-related words/phrases makes it possible to generate a correct text sentence in the target language.

More over, the present invention can provide a method of generating a text sentence in a target language different in a source language and an apparatus thereof that a given keyword is modified, and a source/target language sentence pair is extracted correctly and efficiently based on the modified keyword, in a case in which a given keyword includes a plurality of morphemes, for example, a particle following a word may be removed or converted into a standard form such that sentence pairs including a word similar to but partially different from the original keyword can be correctly extracted from the parallel corpus database, as required, the original keyword may be replaced with a synonym, a narrower-sense word, or a wider-sense word.

The present invention can provide a method of generating a text sentence in a target language different in a source language and an apparatus thereof that when one or more keywords in the source language are given, text sentences of two or more target languages are generated from the given keywords, thus, generation of text sentence is performed in a very efficient manner, and makes it possible for a user to communicate at the same time with a plurality of other users speaking different languages.

Further, the present invention can provide a method of generating a text sentence in a target language different in a source language and an apparatus thereof that a text sentence candidate in the source language is output together with a text sentence candidate in the target language, and thus a user can recognize the exact meaning of the generated text sentence in the target language.

The present invention can provide a method of generating a text sentence in a target language different in a source language and an apparatus thereof that the generated text sentences are evaluated and one or a predetermined number of text sentence candidates are selected and output, for example, a particular number of text sentence candidates with highest scores calculated based on a learning model described later may be output.

Industrial Applicability

By inputting one or more keyword of a mother language, a text sentence in the target language is generated, it makes contribution to an improvement of translation technique, therefore, it has an industrial applicability.

EXPRESSION OF REFERENCE LETTERS

30 Text generation Apparatus
31 Japanese keyword
32 English text sentence
40 Input unit
50 Translation pair extractor
60 Keyword-related phrase storage unit
70 Text generator
80 Output unit
a,k " "彼女 (kanojo)/She"
b,l " "公園 (kouen)/park"
c,m " "行く (iku)/go"
d,n " "公園へ行った。 (kouen he itta.)/I went to the park."
e,o " "彼女と百貨店へ行った。 (kanojo to hyakkatten he itta)/I went to the department store with her."
f,q " "公園へ (Kouen he)/to the park"
g,r " "行った (itta)/I . . . went"
h,s " "彼女と (kanojo to)/with her"
i " "彼女と公園へ行った。 (kanojo to Kouen he itta.)/I went to the park with her."
j " "彼女は公園へ行った。 (kanojo ha Kouen he itta.)/She went to the park."
p " "彼女は動物園へ行った。 (Kanojo ha doubutsuen he itta.)/She went to the zoo."
t " "彼女は…行った (Kanojo ha . . . itta)/She went . . . "
u " "動物園へ (doubutsuen he)/to the zoo"
v ①"彼女と公園へ行った。 (kanojo to Kouen he itta)/I went to the park with her."
w ②"彼女は動物園へ行った。 (Kanojo ha doubutsuen he itta.)/She went to the zoo."
x ② has higher similarity than ①

What is claimed is:

1. A method of generating a text sentence in a target language different in a source language, based on one or more words in the source language input as keywords, the method comprising:

an input step in which one or more keywords in the source language are input via an input means without inputting a full text sentence in the source language, the one or more keywords being a segment of the full text sentence in the source language;

a sentence pair extraction step in which a sentence pair extraction means extracts one or more sentence pairs each including more than one of the keywords from a parallel corpus database including partial correspondence information indicating correspondence between a word/phrase in the source language and a word/phrase in the target language in each sentence pair;

a keyword-related phrase storage step in which a target-language keyword-related phrase corresponding to each source-language keyword-related phrase is detected from the partial correspondence information of each sentence pair and stored as a pair of keyword-related phrases in the source language and in the target language in the form of a keyword-related phrase table in a storage means;

a text sentence candidate generation step in which a text candidate generation means performs dependency relationships of each keyword-related phrase in the source language and in the target language of the pair of keyword-related phrases assumes dependency relationships among keyword-related phrases in the target language described in the keyword-related phrase table and generates one or more target-language text sentence candidates by using a target language keyword-related phrase generation model and a language model by assuming dependency relationships of two or more pairs of keyword-related phrases; and an output step in which at least one text sentence candidate is output from an output means corresponding to the full text sentence in the source language.

2. The method according to claim 1, further comprising, after the sentence pair extraction step, a keyword-related phrase presentation step in which if, in the sentence pair extraction step, two or more sentence pairs are extracted for a keyword input in the input step and if two or more different keyword-related phrases in the source language are detected from the partial correspondence information, then the detected two or more keyword-related phrases in the source language are presented to a user such that the user is allowed to select a keyword-related phrase from the presented two or more keyword-related phrases, wherein in the keyword-related phrase storage step, if the user selects a keyword-related phrase from the presented two or more keyword-related phrases, a keyword-related phrase in the target language corresponding to the selected keyword-related phrase in the source language is described in the keyword-related phrase table.

3. The method according to claim 1 or 2, wherein
each time one keyword is input in the input step, the sentence pair extraction step and the keyword-related phrase storage step are performed;
the method further comprising:
a co-occurrence word extraction step in which one or more co-occurrence words which co-occur with the keyword in the sentence pair are extracted and the extracted one or more co-occurrence words are described in a co-occurrence word table; and
a co-occurrence word presentation step in which the one or more co-occurrence words are presented to a user such that the user can select one or more co-occurrence word from the co-occurrence words described in the co-occurrence word table,
and wherein if one or more co-occurrence words are selected by the user, the selected one or more co-occurrence words are input as new keywords in the input step, and
the text sentence candidate generation step is performed after completion of inputting all keywords.

4. The method according to claim 1, wherein in the sentence pair extraction step, at the beginning of the step, one or more morphemes are added to or subtracted from a keyword input in the input step or a keyword input in the input step is replaced with a similar word.

5. The method according claim 1, wherein
a text sentence is generated for each of two or more target languages by performing the sentence pair extraction step, the keyword-related phrase storage step, and the text sentence candidate generation step for each combination of source and target languages; and
in the output step, text sentence candidates of the respective two or more languages are output.

6. The method according to claim 1, wherein
in the text sentence candidate generation step,
the text candidate generation means assumes dependency relationships among keyword-related phrases in the target language described in the keyword-related phrase table and generates one or more target-language text sentence candidates; and
a source-language text candidate generation means assumes dependency relationships among keyword-related phrases in the source language described in the keyword-related phrase table and generates one or more source-language text sentence candidate,
in the output step, at least one set of text sentences in the source and target languages is output from the output means.

7. The method according to claim 1, further comprising, after the text sentence candidate generation step, an evaluation step in which an evaluation means evaluates a score for each text sentence candidate, wherein
in the output step, at least one text sentence candidate with the highest score is selected based on the evaluation and the selected text sentence candidate is output.

8. The method according to claim 1, wherein each time one keyword is input in the input step, the sentence pair extraction step and the keyword-related phrase storage step are performed, the method further comprising:
a co-occurrence word extraction step in which one or more co-occurrence words which co-occur with the keyword in the sentence pair are extracted and the extracted one or more co-occurrence words are described in a co-occurrence word table; and
a co-occurrence word presentation step in which the one or more co-occurrence words are presented to a user such that the user can select one or more co-occurrence word from the co-occurrence words described in the co-occurrence word table,
wherein if one or more co-occurrence words are selected by the user, the selected one or more co-occurrence words are input as new keywords in the input step, and the text sentence candidate generation step is performed after completion of inputting all keywords,
wherein in the text sentence candidate generation step,
the text candidate generation means assumes dependency relationships among keyword-related phrases in the target language described in the keyword-related phrase table and generates one or more target-language text sentence candidates; and
a source-language text candidate generation means assumes dependency relationships among keyword-related phrases in the source language described in the keyword-related phrase table and generates one or more source-language text sentence candidate,
in the output step, at least one set of text sentences in the source and target languages is output from the output means.

9. The method according to claim 1, wherein each time one keyword is input in the input step, the sentence pair extraction step and the keyword-related phrase storage step are performed, the method further comprising:
a co-occurrence word extraction step in which one or more co-occurrence words which co-occur with the keyword in the sentence pair are extracted and the extracted one or more co-occurrence words are described in a co-occurrence word table; and
a co-occurrence word presentation step in which the one or more co-occurrence words are presented to a user such that the user can select one or more co-occurrence word from the co-occurrence words described in the co-occurrence word table,
wherein if one or more co-occurrence words are selected by the user, the selected one or more co-occurrence words are input as new keywords in the input step,
the text sentence candidate generation step is performed after completion of inputting all keywords, and
after the text sentence candidate generation step, an evaluation step in which an evaluation means evaluates each text sentence candidate,
wherein in the output step, at least one text sentence candidate is selected based on the evaluation and the selected text sentence candidate is output.

10. The method according to claim 1, further comprising, after the text sentence candidate generation step, an evaluation step in which an evaluation means evaluates a score for each text sentence candidate,
- wherein in the output step, at least one text sentence candidate with a score greater than a predetermined threshold is selected based on the evaluation and the selected text sentence candidate is output.

11. The method according to claim 1, further comprising, after the text sentence candidate generation step, an evaluation step in which an evaluation means evaluates a score for each text sentence candidate,
- wherein in the output step, at least one text sentence candidate with a score greater than a predetermined threshold, or as many text candidates with highest scores as a predetermined number N are selected based on the evaluation and the selected text sentence candidate is output.

12. The method of claim 1, wherein, in the text sentence candidate generation step in which a text candidate generation means evaluates one or more text generation candidates assuming dependency relationships among keyword-related phrases in the target language described in the keyword-related phrase table and generates one or more target-language text sentence candidates by using a target language keyword-related phrase generation model and a language model by assuming dependency relationships of pairs of keyword-related phrases, the target language keyword-related phrase generation model depends on the type of information used and includes a trigram, a backward trigram, and one or more modified word sequences.

13. An apparatus for generating a text sentence in a target language different in a source language, based on one or more words in the source language input as keywords, the apparatus comprising:
- input apparatus for inputting one or more keywords in the source language without inputting a full text sentence in the source language, the one or more keywords being a segment of the full text sentence in the source language;
- a parallel corpus database including partial correspondence information indicating correspondence between a word/phrase in the source language and a word/phrase in the target language in each sentence pair;
- a sentence pair extraction means for extracting one or more sentence pairs each including more than one of the keywords from the parallel corpus database;
- a keyword-related phrase storage means for detecting a target-language keyword-related phrase corresponding to each source-language keyword-related phrase from the partial correspondence information of each sentence pair and storing the detected target-language keyword-related phrase in the form of a keyword-related phrase table;
- a text candidate generation means that performs dependency relationships of each keyword-related phrases in the source language and in the target language of the pair of keyword-related phrases described in the keyword-related phrase table and generates one or more target-language sentence candidates by using a target language keyword-related phrase generation model and a language model by assuming dependency relationships or two or more pairs of keyword-related phrases; and
- an output means for outputting at least one text sentence candidate corresponding to the full text sentence in the source language.

14. The according to claim 13, further comprising a source-language keyword-related phrase candidate presentation means that determines, in a case in which two or more sentence pairs corresponding to an input keyword have been extracted by the sentence pair extraction means, whether two or more different keyword-related phrases in the source language are detected from the partial correspondence information associated with the two or more sentence pairs and that, if so, presents to a user the detected two or more keyword-related phrases such that the user is allowed to select a keyword-related phrase from the presented two or more keyword-related phrases in the source language via the input means, wherein
- if the user selects a keyword-related phrase from the presented two or more keyword-related phrases, the keyword-related phrase storage means stores a keyword-related phrase in the target language corresponding to the selected keyword-related phrase in the source language in the keyword-related phrase table.

15. The apparatus according to claim 13 or 14, wherein each time one keyword is input via the input means, the sentence pair extraction means and the keyword-related phrase storage means operate,
the apparatus further comprising:
- a co-occurrence word extraction means for extracting one or more co-occurrence words which co-occur with the keyword in the sentence pair and describing the extracted one or more co-occurrence words in a co-occurrence word table; and
- a co-occurrence word presentation means for presenting the one or more co-occurrence words to a user such that the user can select one or more co-occurrence word from the co-occurrence words described in the co-occurrence word table,
- and wherein if one or more co-occurrence words are selected by the user via the input means, the selected one or more co-occurrence words are input as new keywords, and
the text candidate generation means operates after completion of inputting all keywords.

16. The apparatus according to claim 13, further comprising a keyword modification means for modifying a keyword input via the input means by adding or subtracting one or more morphemes to or from the keyword or replacing the keyword with a similar word, wherein
the sentence pair extraction means performs keyword modification using the keyword modification means.

17. The apparatus according to claim 13, wherein the parallel corpus database includes partial correspondence information indicating correspondence between a word/phrase in the source language and a word/phrase in the target language in each sentence pair;
- the sentence pair extraction means, the keyword-related phrase storage means, and the text candidate generation means perform processing for each combination of source and target languages; and
- text sentence candidates of the respective two or more languages are output from the output means.

18. An apparatus according to claim 13, wherein the text candidate generation means assumes dependency relationships among keyword-related phrases in the target language described in the keyword-related phrase table and generates one or more target-language text sentence candidates,
the apparatus further comprising source-language text candidate generation means that assumes dependency relationships among keyword-related phrases in the source language described in the keyword-related phrase table and generates one or more source-language text candidate, and wherein at least one set of text sentences in the source and target languages is output from the output means.

19. The apparatus according to claim 13, further comprising an evaluation means for evaluating the one or more text sentence candidates.

20. The apparatus according to claim 13, wherein each time one keyword is input via the input means, the sentence pair extraction means and the keyword-related phrase storage means operate, the apparatus further comprising:
a co-occurrence word extraction means for extracting one or more co-occurrence words which co-occur with the keyword in the sentence pair and describing the extracted one or more co-occurrence words in a co-occurrence word table; and
a co-occurrence word presentation means for presenting the one or more co-occurrence words to a user such that the user can select one or more co-occurrence word from the co-occurrence words described in the co-occurrence word table,
and wherein if one or more co-occurrence words are selected by the user via the input means, the selected one or more co-occurrence words are input as new keywords, and
the text candidate generation means operates after completion of inputting all keywords,
wherein the text candidate generation means assumes dependency relationships among keyword-related phrases in the target language described in the keyword-related phrase table and generates one or more target-language text sentence candidates,
the apparatus further comprising source-language text candidate generation means that assumes dependency relationships among keyword-related phrases in the source language described in the keyword-related phrase table and generates one or more source-language text candidate, and
wherein at least one set of text sentences in the source and target languages is output from the output means.

21. The apparatus according to claim 13, wherein each time one keyword is input via the input means, the sentence pair extraction means and the keyword-related phrase storage means operate, the apparatus further comprising:
a co-occurrence word extraction means for extracting one or more co-occurrence words which co-occur with the keyword in the sentence pair and describing the extracted one or more co-occurrence words in a co-occurrence word table; and
a co-occurrence word presentation means for presenting the one or more co-occurrence words to a user such that the user can select one or more co-occurrence word from the co-occurrence words described in the co-occurrence word table,
wherein if one or more co-occurrence words are selected by the user via the input means, the selected one or more co-occurrence words are input as new keywords, and
the text candidate generation means operates after completion of inputting all keywords,
an evaluation means for evaluating the one or more text sentence candidates.

22. The apparatus of claim 13, wherein, in the text candidate generation means that performs dependency relationships of each keyword-related phrase in the source language and in the target language of the pair of keyword-related phrases described in the keyword-related phrase table and generates one or more target-language sentence candidates by using a target language keyword-related phrase generation model and a language model by assuming dependency relationships of two or more pairs of keyword-related phrases, the target language keyword-related phrase generation model depends on the type of information used and includes a trigram, a backward trigram, and one or more modified word sequences.

23. A method of generating a text sentence in a target language different from a source language, based on one or more words in the source language input as keywords, the method comprising:
an input step in which the one or more keywords in the source language are input via an input means without inputting a full text sentence in the source language, the one or more keywords being a segment of the full text sentence in the source language;
a sentence pair extraction step in which a sentence pair extraction means extracts one or more sentence pairs each including more than one of the keywords from a parallel corpus database including partial correspondence information indicating correspondence between a word/phrase in the source language and a word/phrase in the target language in each sentence pair;
a keyword-related phrase storage step in which a target-language keyword-related phrase corresponding to each source-language keyword-related phrase is detected from the partial correspondence information of each sentence pair and stored in the form of a keyword-related phrase table in a storage means, wherein the target-language keyword-related phrase is a content word;
a word sequence generation rule acquisition step in which a word sequence generation rule acquisition unit searches for a pair of sentences including the content word from a parallel corpus and performs morphological analysis and syntactic analysis, extracts word sequences including the content word from the pair of sentences, and acquires and stores a word sequence generation rule indicating how to generate the keyword-related phrase; and
a word generation candidate generation step in which a word sequence candidate generator generates word sequence candidates of the target language included in a text sentence candidate in accordance with the word sequence generation rules;
a text sentence candidate generation step in which a text candidate generation means performs dependency relationships of each keyword related phrase in the source language and in the target language of the pair of keyword-related phrases described in the keyword-related phrase table and/or the word sequence candidates in the source language and in the target language, and generates one or more target language text sentence candidates by using a target language keyword-related phrase generation model and a language model by assuming dependency relationships of two or more pairs of keyword-related phrases; and
an output step in which at least one text sentence candidate is output from an output means corresponding to the full text sentence in the source language.

24. An apparatus for generating a text sentence in a target language different from a source language, based on one or more words in the source language input as keywords, the apparatus comprising:
input apparatus for inputting the one or more keywords in the source language without inputting a full text sentence in the source language, the one or more keywords being a segment of the full text sentence in the source language;

a parallel corpus database including partial correspondence information indicating correspondence between a word/phrase in the source language and a word/phrase in the target language in each sentence pair;

a sentence pair extraction means for extracting one or more sentence pairs each including more than one of the keywords from the parallel corpus database;

a keyword-related phrase storage means for detecting a target-language keyword-related phrase corresponding to each source-language keyword-related phrase from the partial correspondence information of each sentence pair and storing the detected target-language keyword-related phrase in the form of a keyword-related phrase table;

a word sequence generation rule acquisition unit for acquiring a word sequence generation rule indicating how to generate the keyword-related phrase from a word sequence by searching for a pair of sentences including the content word from a parallel corpus, performing morphological analysis and syntactic analysis, extracting a word sequence including the content word from the pair of sentences, a word sequence candidate generator for generating word sequence candidates in the target language included in a text sentence candidate in accordance with the word sequence generation rules;

a text candidate generation means that performs dependency relationships of each keyword related phrase in the source language and in the target language described in the keyword-related phrase table and/or the word sequence candidates in the source language and n the target language of the pair of keyword-related phrases, and that generates one or more target language text sentence candidates by using a target language keyword-related phrase generation model and a language model by assuming dependency relationships of two or more pairs of keyword-related phrases; and an output means for outputting at least one text sentence candidate corresponding to the full text sentence in the source language.

* * * * *